US008254633B1

(12) United States Patent
Moon et al.

(10) Patent No.: US 8,254,633 B1
(45) Date of Patent: Aug. 28, 2012

(54) METHOD AND SYSTEM FOR FINDING CORRESPONDENCE BETWEEN FACE CAMERA VIEWS AND BEHAVIOR CAMERA VIEWS

(75) Inventors: Hankyu Moon, State Collage, PA (US); Rajeev Sharma, State College, PA (US); Namsoon Jung, State College, CA (US)

(73) Assignee: VideoMining Corporation, State College, PA (US)

( * ) Notice: Subject to any disclaimer, the term of this patent is extended or adjusted under 35 U.S.C. 154(b) by 796 days.

(21) Appl. No.: 12/386,656

(22) Filed: Apr. 21, 2009

(51) Int. Cl.
*G06K 9/62* (2006.01)
(52) U.S. Cl. ............................ 382/103; 382/118; 382/159
(58) Field of Classification Search .................... None
See application file for complete search history.

(56) References Cited

U.S. PATENT DOCUMENTS

| | | | |
|---|---|---|---|
| 6,950,123 | B2 | 9/2005 | Martins |
| 6,987,885 | B2 | 1/2006 | Gonzalez-Banos et al. |
| 7,319,479 | B1* | 1/2008 | Crabtree et al. ............ 348/169 |
| 7,356,425 | B2 | 4/2008 | Krahnstoever et al. |
| 7,693,310 | B2* | 4/2010 | Kato et al. .................. 382/118 |
| 8,010,402 | B1* | 8/2011 | Sharma et al. ............. 705/7.29 |
| 2004/0156530 | A1 | 8/2004 | Brodsky et al. |
| 2005/0058321 | A1 | 3/2005 | Buehler |
| 2005/0265582 | A1* | 12/2005 | Buehler et al. ............. 382/103 |
| 2006/0028552 | A1 | 2/2006 | Aggarwal et al. |
| 2006/0285723 | A1 | 12/2006 | Morellas et al. |
| 2007/0179918 | A1* | 8/2007 | Heisele et al. ................. 706/13 |
| 2008/0130951 | A1* | 6/2008 | Wren et al. .................. 382/103 |
| 2010/0194851 | A1* | 8/2010 | Pasupaleti et al. ........... 348/36 |
| 2010/0278386 | A1* | 11/2010 | Hoeflinger ................... 382/103 |

* cited by examiner

*Primary Examiner* — Brian P Werner

(57) ABSTRACT

The present invention is a method and system to provide correspondences between a face camera track and a behavior camera track, for the purpose of making correspondence between the data obtained from each track. First, multiple learning machines are trained so that each of the machines processes pairwise person images from a specific pose region, and estimates the likelihood of two person images belonging to the same person based on image appearances. Then, the system acquires a person image associated with a behavior camera track, determines the pose of the person image based on its floor position, and corrects the pose of the person image. The system also acquires person images from face camera images associated with a face camera track, and combines the images with corrected person images from the previous step to form pairwise person images. The pairwise person image is fed to the trained pose-dependent pairwise person verification machines according to the pose of the person images, to compute the appearance match scores between the pair of person images. Finally, the combination of the appearance match scores and the spatiotemporal match scores of the pair of person images determines whether or not the person images belong to the same person.

20 Claims, 20 Drawing Sheets

METHOD AND SYSTEM FOR FINDING CORRESPONDENCE BETWEEN FACE CAMERA VIEWS AND BEHAVIOR CAMERA VIEWS

FEDERALLY SPONSORED RESEARCH

The invention was made partially with U.S. Government support under Grant No. 0548734 awarded by the National Science Foundation. The U.S. government has certain rights in the invention.

CROSS-REFERENCE TO RELATED APPLICATIONS

Not Applicable

SEQUENCE LISTING OR PROGRAM

Not Applicable

BACKGROUND OF THE INVENTION

1. Field of the Invention

The present invention is a method and system to provide correspondences between the face camera tracks and behavior camera tracks in video surveillance or retail customer behavior analysis.

2. Background of the Invention

Increasingly, a large number of video cameras are being installed in public spaces such as airports, train stations, or public buildings for surveillance and public safety. Cameras installed in commercial spaces such as stores or shopping malls are also being used for monitoring or for video analytics for marketing purposes. These cameras are often connected to computer systems for automatic analysis, by tracking people and analyzing their behavior. Under some scenarios, the system needs to identify people or classify people into meaningful groups. It is sometimes necessary to make correspondences among people appearing in different camera views. In security applications, a person's behavior can be analyzed and recognized from video data feed by one camera view (potentially a far-range view), while the identity of the person can be recognized by a different (typically a close-range) view. In shopper behavior analysis applications, top-down camera views may provide the shopping behavior of customers while camera views capturing faces of customers may be used to identify the customer's demographic information.

Both of these applications typically track people within each camera view. When the collection of cameras cover the area to be monitored without too much gap, only the positions and the timestamps of the tracked person from different camera views can be utilized to make the correspondences. On the other hand, when the designated area is sparsely covered by cameras, additional information is required to make correspondences among people appearing in these sparsely positioned cameras to ensure the continuity of the tracks.

The present invention concerns the problem of multi-camera tracking of people, especially the issue of making correspondences between people appearing in face camera views and people appearing in behavior camera views. The correspondence problem is not trivial, because the appearance of a person in a face camera view is often significantly different from the appearance of the same person in behavior camera views, mostly due to different camera positions and angles. The face camera typically captures the facial image of people from slightly above the facial level, but mostly at angles not far from horizontal. The behavior camera orientation can be vastly different, from almost horizontal to vertical angles. On top of the viewpoint issue, the cameras can only observe the part of the body that is facing the camera. In extreme cases, one camera is able to capture only the front side of the person, while the other camera is able to capture only the rear side of the person. Therefore, the appearance changes of people due to camera angles and bodily pose can be dramatic, and is hard to model in a systematic manner; comparing the bodily appearances of people across the cameras becomes a major problem.

The present invention provides a system and method to make correspondences between person tracks in behavior cameras and person tracks in face cameras. As mentioned, it is necessary to utilize appearance information of people when there are significant gaps in camera coverage. As long as the system can determine whether two body images appearing in different views are instances of the same person, the correspondences can be made. However, it is nontrivial to solve, due to the drastic changes of appearance of body image across camera views. The present invention adopts a machine learning approach to solve the correspondence problem. The two candidate body images are paired into a single image; "the pairwise body image" is fed to a learning machine to be determined whether or not they are the same person. The machine is trained to estimate the likelihood of the two body images in the pair belonging to the same person.

The potentially very diverse body pose can still make it hard for the machine to verify the person's identity. In most camera placements, the camera position is static; therefore, the floor position of the person determines the body pose relative to the camera, assuming that the person is standing upright. This also applies to pan/tilt cameras, as long as the base of the camera is fixed. In one exemplary embodiment, the present invention divides the camera views, according to the distance from the camera axis, to handle each view using separate learning machines. The divided pose regions will have the form of area between concentric circles (or ellipses), and within each pose region the body image will go through the same amount of distortion. The angular position of the body will also determine the orientation of the body image. Therefore, the system will automatically recognize both the amount of distortion and the orientation based on the floor position. The body image is then corrected to have a standard pose (upright orientation and size), and is sent to the machine trained for that particular pose region.

There have been prior attempts for tracking people across multiple camera views. U.S. Pat. No. 6,950,123 of Martins (hereinafter Martins) disclosed a method and system for simultaneous tracking of multiple objects in a sequence of video frames captured by multiple cameras. The tracking may be accomplished by extracting a foreground elements from a background in a frame, segmenting objects from the foreground surface, tracking objects within the frame, globally tracking positions of objects over time across multiple frames, fusing track data of objects obtained from multiple cameras to infer object positions, and resolving conflicts to estimate the most likely object positions over time. Embodiments of the present invention improve substantially over existing trackers by including a technique for extraction of the region of interest that corresponds to a playing field, a technique for segmenting players from the field under varying illuminations, a template matching criteria that does not rely on specific shapes or color coherency of objects but on connected component properties, and techniques for reasoning about occlusions and consolidating tracking data from multiple cameras.

U.S. Pat. No. 6,987,885 of Gonzalez-Banos, et al. (hereinafter Gonzalez-Banos) disclosed systems, apparatuses, and methods that determine the number of people in a crowd using visual hull information. In one embodiment, an image sensor generates a conventional image of a crowd. A silhouette image is then determined based on the conventional image. The intersection of the silhouette image cone and a working volume is determined. The projection of the intersection onto a plane is determined. Planar projections from several image sensors are aggregated by intersecting them, forming a subdivision pattern. Polygons that are actually empty are identified and removed. Upper and lower bounds of the number of people in each polygon are determined and stored in a tree data structure. This tree is updated as time passes and new information is received from image sensors. The number of people in the crowd is equal to the lower bound of the root node of the tree.

U.S. Pat. No. 7,356,425 of Krahnstoever, et al. (hereinafter Krahnstoever) disclosed a method for calibrating a projective camera. The method includes acquiring information by detecting at least one object on a substantially flat ground plane within a field of view. A projective camera calibration is performed. A measurement uncertainty is considered to yield a plurality of camera parameters from the projective camera calibration.

U.S. Pat. Appl. Pub. No. 2004/0156530 of Brodsky, et al. (hereinafter Brodsky) disclosed a method and system that is configured to characterize regions of an environment by the likelihoods of transition of a target from each region to another. The likelihoods of transition between regions is preferably used in combination with conventional object-tracking algorithms to determine the likelihood that a newly-appearing object in a scene corresponds to a recently-disappeared target. The likelihoods of transition may be predefined based on the particular environment, or may be determined based on prior appearances and disappearances in the environment, or a combination of both. The likelihoods of transition may also vary as a function of the time of day, day of week, and other factors that may affect the likelihoods of transitions between regions in the particular surveillance environment.

U.S. Pat. Appl. Pub. No. 2005/0058321 of Buehler (hereinafter Buehler) disclosed a computerized method of image analysis that includes receiving first image data for a plurality of first video frames representing a first scene. Each first video frame is composed of a plurality of image regions, and a first object is present in an image region of at least one first video frame. Second image data is received for a plurality of second video frames representing a second scene. Each second video frame is composed of a plurality of image regions, and a second object is present in an image region of at least one second video frame. The method also includes determining a relationship between a first image region and a second image region based on a probabilistic correlation between occurrences of the first object being present in the first image region and occurrences of the second object being present in the second image region.

U.S. Pat. Appl. Pub. No. 2006/0028552 of Aggarwal, et al. (hereinafter Aggarwal) disclosed a unified approach, a fusion technique, a space-time constraint, a methodology, and system architecture. The unified approach is to fuse the outputs of monocular and stereo video trackers, RFID and localization systems, and biometric identification systems. The fusion technique is provided that is based on the transformation of the sensory information from heterogeneous sources into a common coordinate system with rigorous uncertainties analysis to account for various sensor noises and ambiguities. The space-time constraint is used to fuse different sensors using the location and velocity information. Advantages include the ability to continuously track multiple humans with their identities in a large area. The methodology is general so that other sensors can be incorporated into the system. The system architecture is provided for the underlying real-time processing of the sensors.

U.S. Pat. Appl. Pub. No. 2006/0285723 of Morellas, et al. (hereinafter Morellas) disclosed a system for tracking objects across an area having a network of cameras with overlapping and non-overlapping fields-of-view. The system may use a combination of color, shape, texture and/or multi-resolution histograms for object representation or target modeling for the tracking of an object from one camera to another. The system may include user and output interfacing.

In Martins, multi-person and multi-camera tracking is carried out by first motion-based segmentation, connected component grouping, and Sequential Monte Carlo multi-hypotheses tracking. When the tracker has observation gaps between camera views, it easily loses track of people. Gonzales-Banos mainly deals with the problem of resolving multiple views of the same person by constructing silhouette image cones and working volumes, and parsing the tree data structure constructed from intersections of image cones. Both Martins and Gonzales-Banos try to resolve the ambiguity among multiple instances of the same person under the assumption of overlapping cameras, while the present invention handles the correspondence problem between views that are non-overlapping. In Krahnstoever, the primarily concern is the problem of multi-camera calibration based on minimal information. The present invention adopts a similar method to achieve correspondence between overlapping camera views based on geometry, but also addresses the problem of corresponding non-overlapping camera views. Brodsky deals with the correspondence problem between targets appearing in and disappearing from camera views, based on transition probabilities between regions which are measured from color, size, shape, orientation, and motion of the tracked targets. Buehler makes correspondence between regions covered by different cameras and the correspondence between objects in different regions. Both Brodsky and Buehler aim to solve the multi-view correspondence problem by using prior transition information between regions. The present invention adopts a novel machine learning approach to solve the correspondence problems between any pair of object (or person) instances under any circumstances, without using any site-dependent prior information. It is the main task of Aggarwal to make correspondence between tracks from different sensors, including RFID, based on spatial, temporal, and appearance cues. The present invention assumes only visual information to solve the correspondence. In Morellas, the tracking of an object across multiple overlapping or non-overlapping cameras is handled by a particle filter-based tracker that utilizes color, shape, texture, and histograms. Under very challenging circumstances where the camera angles are extremely different, the appearance changes of people due to viewpoint are very difficult to model. Using a color, shape, or color histogram may fail to take into account this manner of nonlinear changes. The present invention deals with the appearance changes by learning it using a large number of data-pairs of body images, both matching and non-matching. One or more learning machine(s) is trained to determine whether or not a given pair of body images belong to the same person, which is one of the novel features of the present invention.

SUMMARY

The present invention is a method and system to provide correspondences between the face camera tracks and behavior camera tracks in video surveillance or retail customer behavior analysis.

It is one of the objectives of the first step of the processing to generate pairwise person images and annotate them according to the match.

It is one of the objectives of the second step of the processing to train pose-dependent pairwise person verification machines so that each of the machines processes person images from a specific pose region, and estimates the likelihood of two person images belonging to the same person.

It is one of the objectives of the third step of the processing to acquire person images associated with a behavior camera track, determine the pose of the person image based on its floor position, and correct the pose of the person image.

It is one of the objectives of the fourth step of the processing to acquire person images from face camera images associated with a face camera track, and combine the images with corrected person images from the previous step to form pairwise person images.

It is one of the objectives of the fifth step of the processing to feed the pairwise person images to the trained pose-dependent pairwise person verification machines according to the pose of the person images to compute the appearance match scores between the pair of person images.

It is one of the objectives of the sixth step of the processing to combine the appearance match scores and the spatiotemporal match scores of the pair of person images to determine whether or not the person images belong to the same person.

DRAWINGS-FIGURES

DETAILED DESCRIPTION OF THE INVENTION

Figure 1:
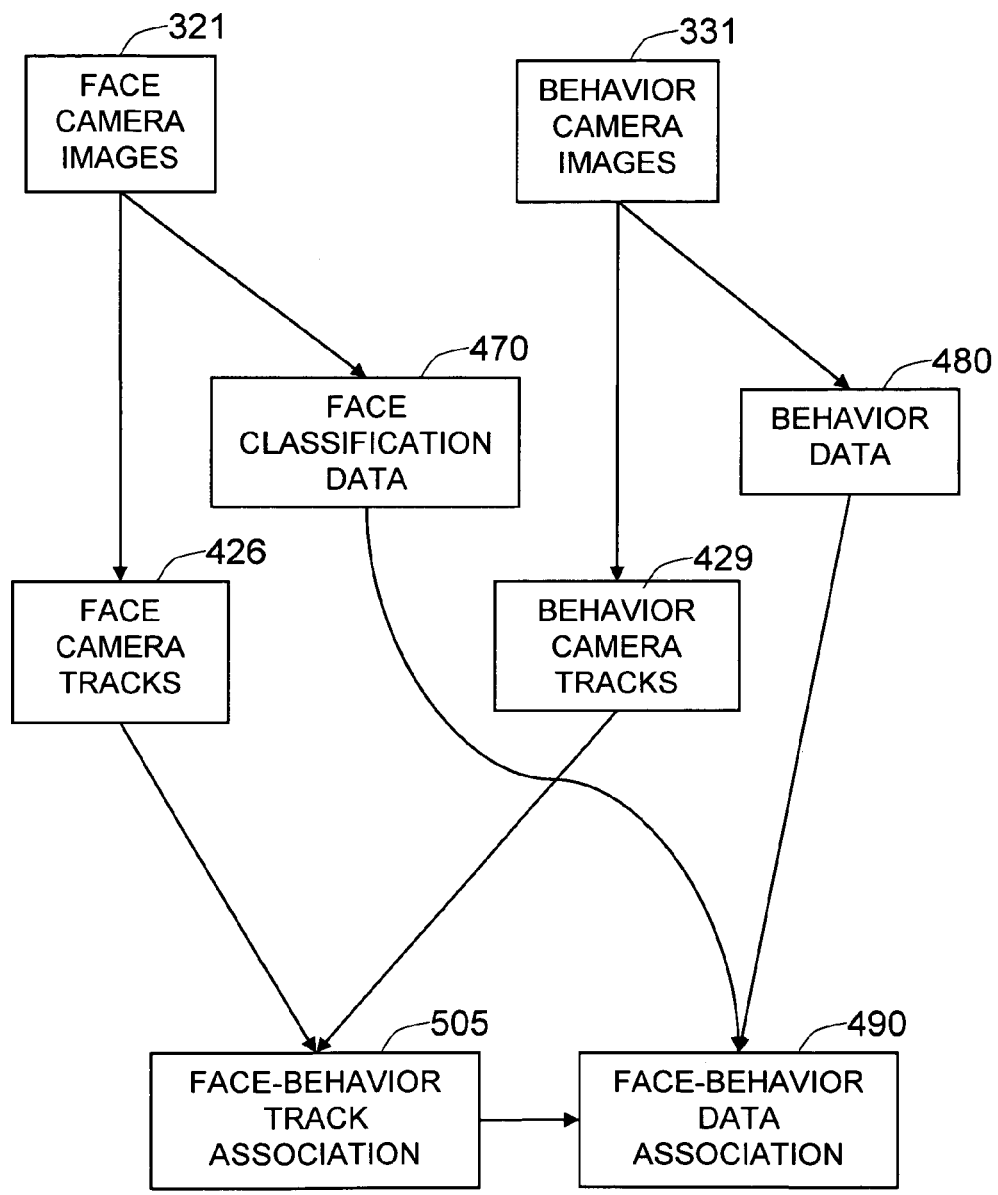
FIG. 1 is an overall scheme of the system in a preferred embodiment of the invention.

FIG. 1 is an overall scheme of the system in a preferred embodiment of the invention. The system uses face camera images 321 to track people in the face camera view to generate face camera tracks 426. The system also uses behavior camera images 331 to track people in the behavior camera view 346 to generate behavior camera tracks 429. On the other hand, the system processes face camera images 321 to classify facial images to generate face classification data 470; it also processes behavior camera images 331 to generate behavior data 480. The correspondence between the face camera tracks 426 and behavior camera tracks 429 is found in the face-behavior track association 505 step. The step utilizes both the match in position and time of the tracks and the match in appearances of the people appearing to both views. One of the main features of the present invention is a novel method for matching the appearance of a person in face camera images and the appearance of the same person in behavior camera images.

Once the track association is made, the face-behavior track association 505 provides face-behavior data association 490—the correspondence between the face classification data 470 and the behavior data 480. For example, suspicious behavior of a person detected from behavior camera images 331 can be associated with the identity of the person recognized from face camera images 321. In another example, the shopping behavior of a customer in a store recognized from behavior camera images can be associated with a particular demographics group of the person recognized from face camera images.

The present invention is a method and apparatus for providing correspondences between the face camera tracks and behavior camera tracks in video surveillance or retail customer behavior analysis.

Figure 2:
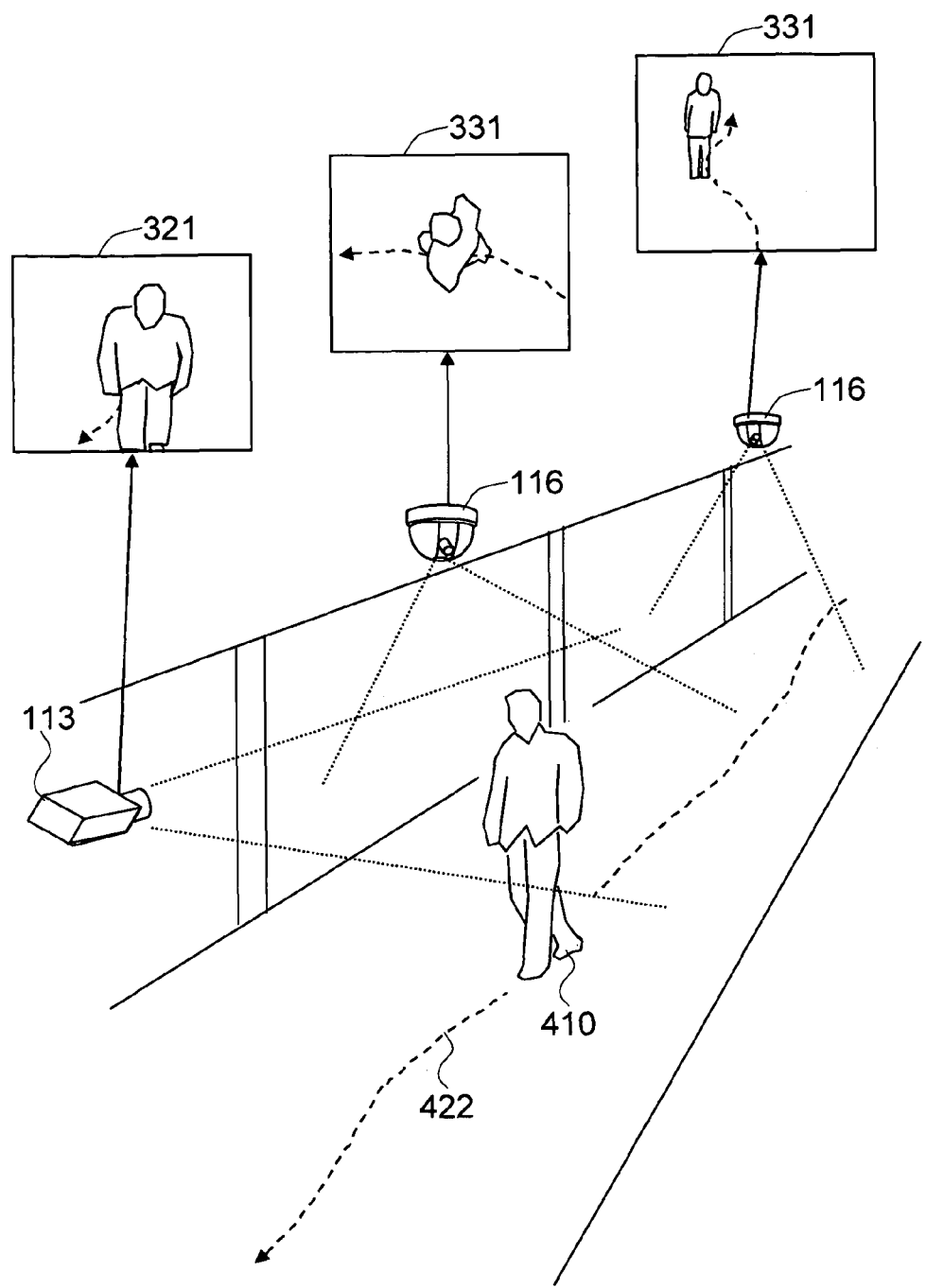
FIG. 2 shows a view of the system of the invention in an operational environment in an exemplary embodiment.

FIG. 2 shows a view of the system of the invention in an operational environment in an exemplary embodiment. A person 410 walks through an area where multiple cameras are placed to monitor activities. The behavior camera 116 first captures the far-range view of the person, 410 so that the person's bodily behavior can be recognized. The face camera 113 captures the close-range frontal view of the person 410 so that the person's identity or demographic profile can be extracted. Within each camera view, the person is tracked so that a continuous and reliable track can be established. However, it is also necessary to provide correspondences across the camera views to construct a correct track of the person. The face camera images and behavior camera images reveal different views of the person, so that when potentially another person is in the area a reliable tracking scheme to maintain the identities of individuals becomes crucial. The association between camera views allows the face classification data 470 recognized from face camera images 321 and the behavior data 480 extracted from behavior camera images 331 to be correctly associated to the same person as well.

Figure 3:
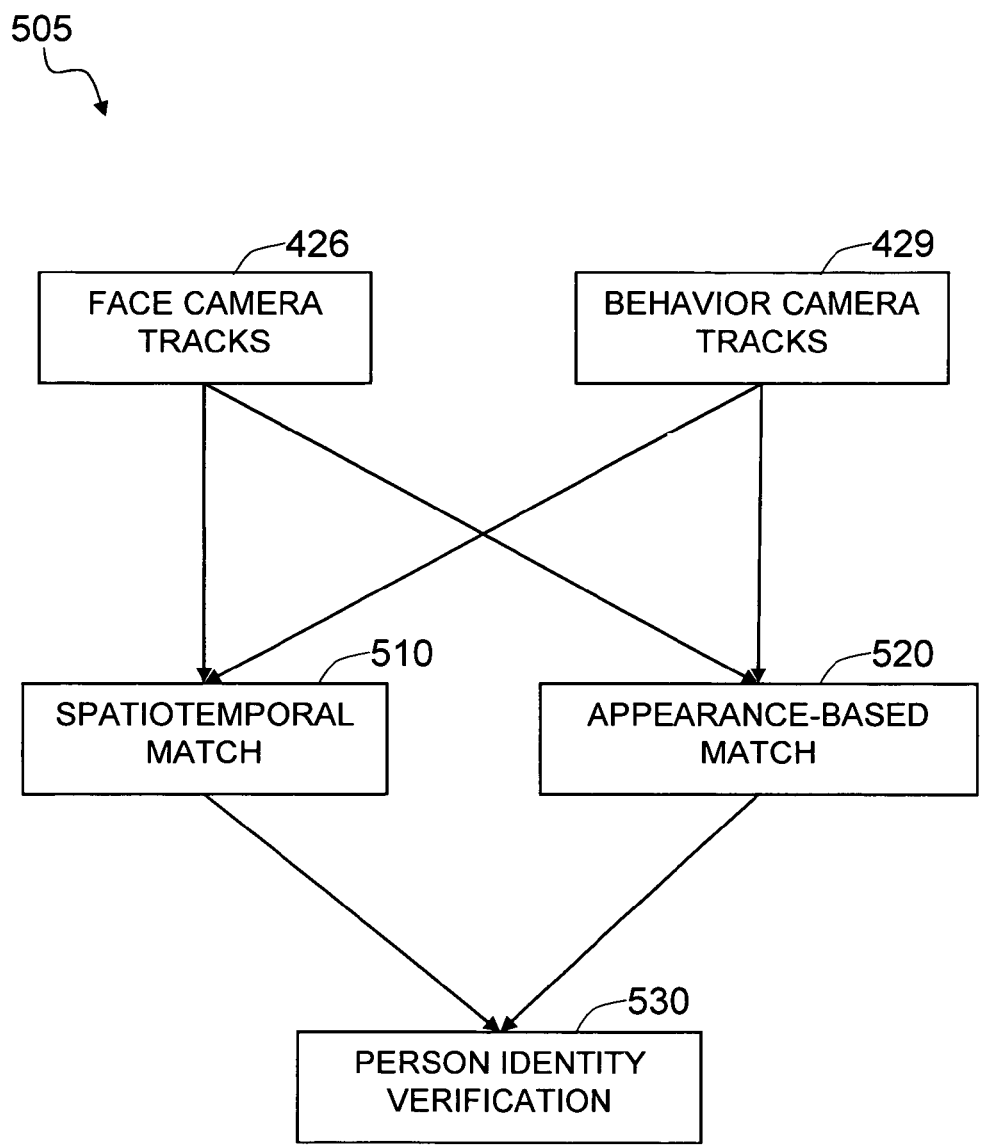
FIG. 3 shows an exemplary embodiment of the face-behavior track association method.

FIG. 3 shows an exemplary embodiment of the face-behavior track association 505 method. Each of the face camera tracks 426 and the behavior camera tracks 429 reveals the movement of people within each field-of-view. The step makes correspondence between the face camera tracks 426 and the behavior camera tracks 429, so that the any information extracted from face camera images can be related to information extracted from behavior camera images. The step utilizes spatiotemporal match 510 and appearance-based match 520 to make correspondences. When these camera views overlap, spatiotemporal match 510 alone can provide reliable correspondence; each camera view can be projected to a common coordinate system based on the camera geometry. However, when camera views don't overlap, appearance-based match 520 can determine whether a person appearing in one camera is the same person appearing in another camera based on similarity in bodily appearance. Both the spatiotemporal match score and the appearance-based match score are combined to determine whether each candidate pair of tracks is from the same person, in person identity verification 530 step.

Figure 4:
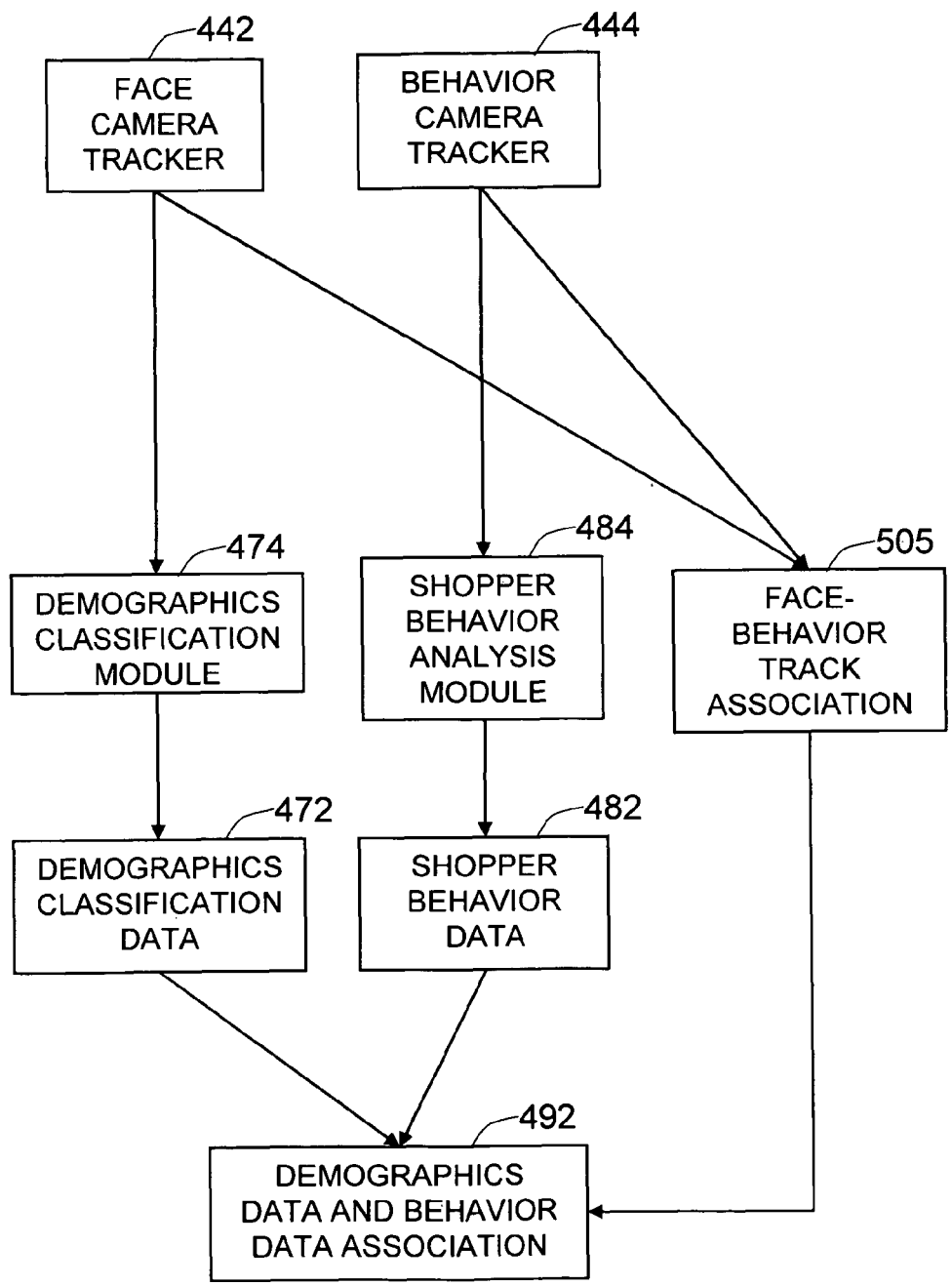
FIG. 4 shows an exemplary embodiment of demographics data and behavior data association, which is an exemplary embodiment of the face-behavior data association.

FIG. 4 shows an exemplary embodiment of demographics data and behavior data association 492, which is an exemplary embodiment of the face-behavior data association 490. The behavior camera tracker 444 tracks the shopper, and the shopper behavior analysis module 484 recognizes the shopping behavior to generate shopper behavior data 482. For example, the shopper behavior data 482 may include purchase events, where the purchased item(s) and the timestamp are recorded. The face camera 113 captures the shopper's facial image, the face camera tracker 442 tracks the face, and the demographics classification module 474 determines the demographic group of the person.

The face-behavior track association 505 step finds the correspondence between the face camera tracks and the behavior camera tracks, so that the demographics classification data 472 and the shopper behavior data 482 can find meaningful correspondences in the demographics data and behavior data association 492 step.

Figure 5:
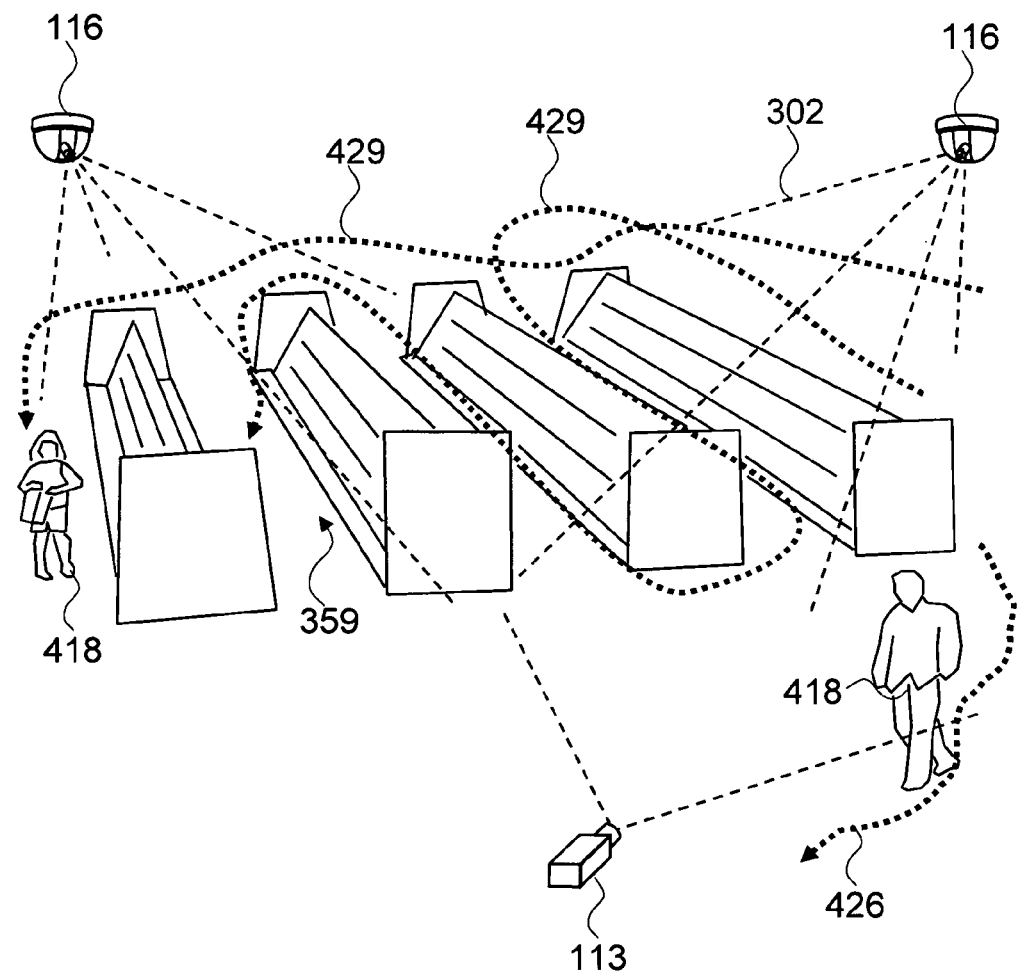
FIG. 5 shows a view of the system of the invention in an operational environment in an exemplary embodiment.

FIG. 5 shows a view of the system of the invention in an operational environment in an exemplary embodiment. Each shopper 418 browses through the store aisle 359, choosing items to purchase. The behavior camera 16 captures the shoppers within each field-of-view 302, and possibly across different fields-of-view. The behavior camera tracker 444 tracks the shopper, and the shopper behavior analysis module 484 recognizes the shopping behavior to generate shopper behavior data 482. For example, the shopper behavior data 482 may include a purchase event, where the purchased item(s) and the timestamp are recorded. The face camera 113 captures the shopper's facial image, the face camera tracker 442 tracks the face, and the demographics classification module 474 determines the demographic group of the person.

Then the face-behavior track association 505 step finds the correspondence between the face camera tracks 426 and the behavior camera tracks 429.

Figure 6:
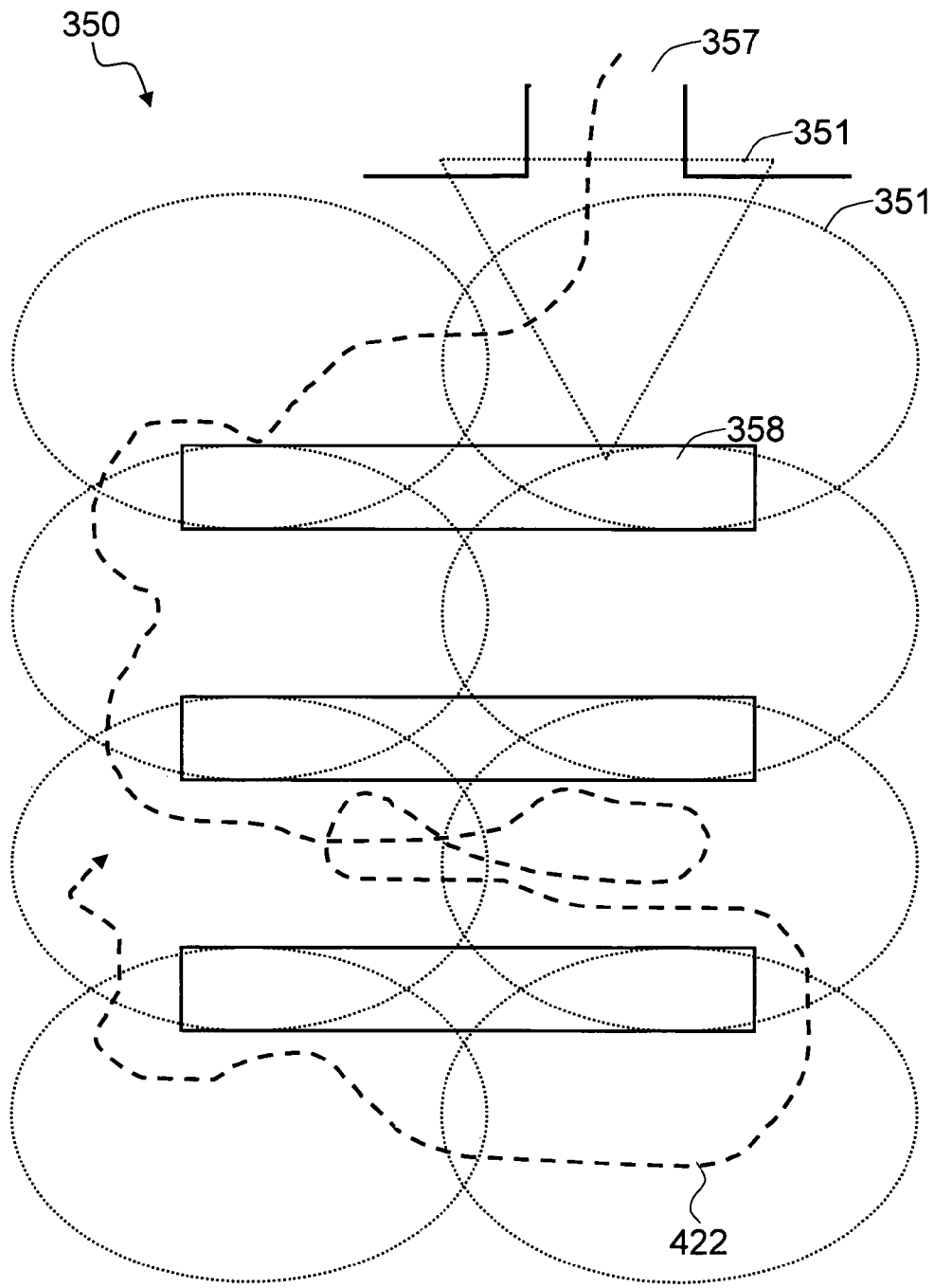
FIG. 6 shows an exemplary behavior camera tracker where the present invention can be operated.

FIG. 6 shows an exemplary behavior camera coverage map 350 where the present invention can be operated. It shows a spatially-limited area having one or more entrance(s) 357 and fixtures 358 such as shelves or displayed materials. In this embodiment, a face camera 113 captures the view of people entering the area, so that their facial images can be acquired and analyzed. The whole area is monitored by multiple behavior cameras 117 so that people's activities can be captured and analyzed within the camera coverage 351. In this embodiment, the area is densely covered by the cameras, so that the coverage 351 of one camera is overlapped by the coverage 351 of at least one other camera; a person's whole track 422 can be covered by the camera coverage 351. Under this scenario, a person's movement can be tracked throughout the area based on the spatiotemporal matches among different camera views.

Figure 7:
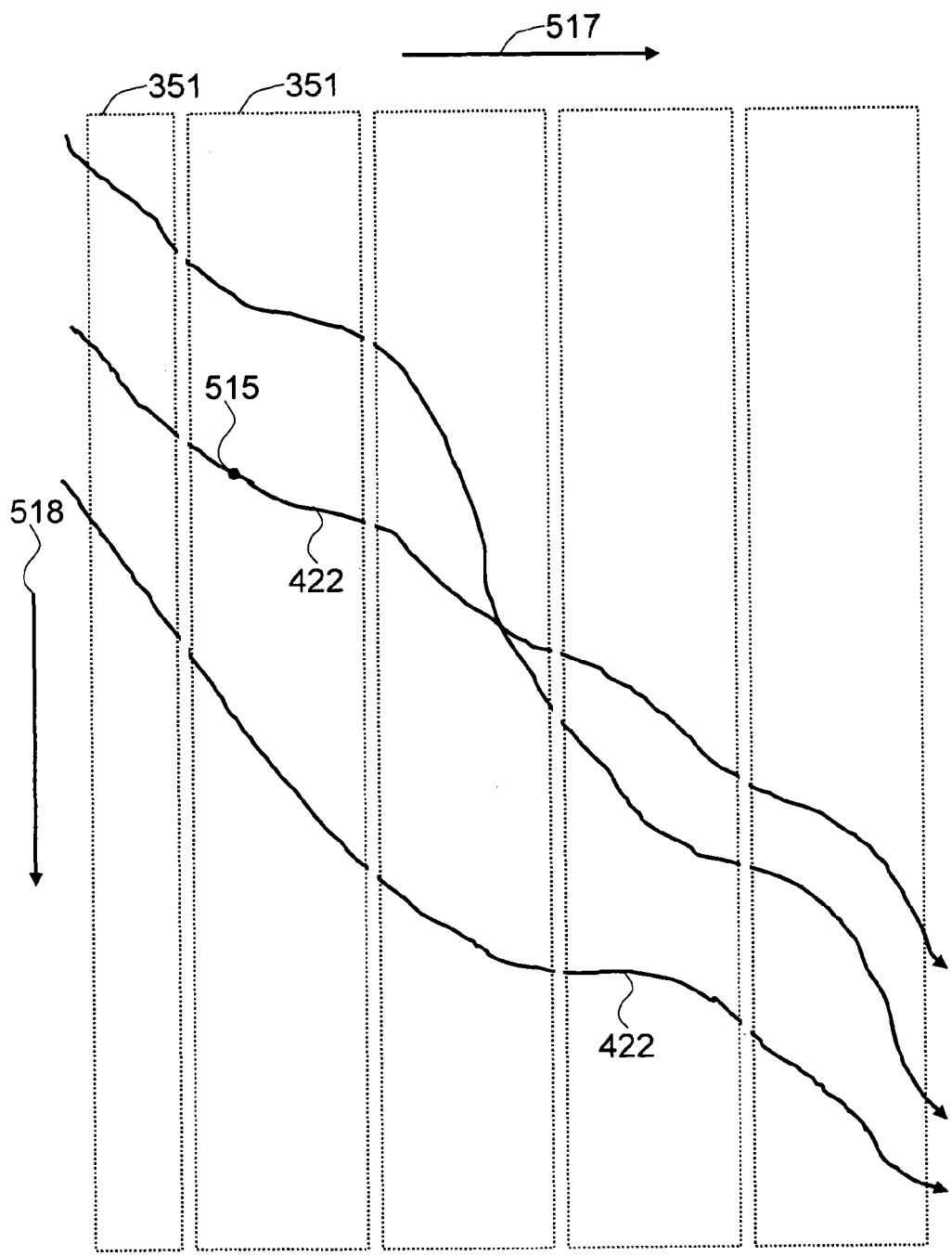
FIG. 7 shows the scheme of spatiotemporal match among tracks from different camera views.

FIG. 7 shows the scheme of spatiotemporal match 510 among tracks from different camera views 341. The horizontal direction in the figure represents spatial dimension 517 (reduced to one dimension for a clear presentation), and the vertical direction represents temporal dimension 518. Each rectangle in the figure represents an area that is covered by a single camera view—camera coverage 351, stretched vertically to reveal temporal dimension; a horizontal cross-section of the rectangle is the area at a specific time instance.

Each curved line crossing the rectangles shows a track 422 traversed by each person moving across the camera coverage. Because there are little gaps in this dense camera placement, the correspondence between tracks from different camera coverage areas is straightforward. Each point in the figure represents a spatiotemporal coordinate 515; the correspondence can be made simply based on the proximity in the spatiotemporal dimension.

Figure 8:
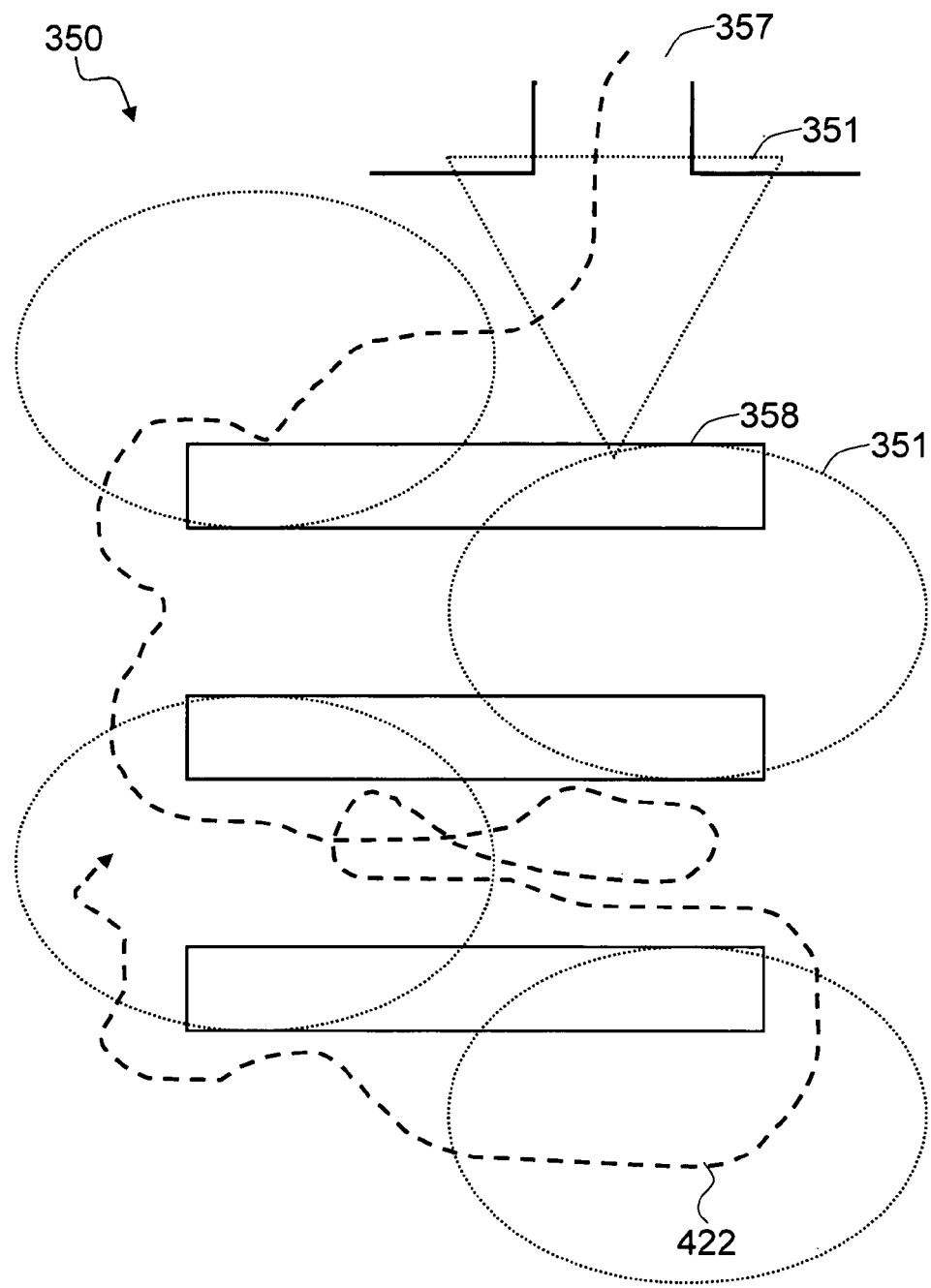
FIG. 8 shows an exemplary behavior camera tracker where the present invention can be operated.

FIG. 8 shows an exemplary behavior camera coverage map 350 where the present invention can be operated. It shows a spatially-limited area having one or more entrance(s) 357 and fixtures 358, such as shelves or displayed materials. In this embodiment, a face camera 113 captures the view of people entering the area, so that their facial images can be acquired and analyzed. The whole area is monitored by multiple behavior cameras 117 so that people's activities can be captured and analyzed. In this embodiment, the area is sparsely covered by the cameras so that there are gaps in camera coverage 351. Here, spatiotemporal match 510 alone cannot provide enough information to make correspondences; if two people in close proximity disappear from one camera view and appear in another camera view within a short amount of time, it is hard to make a reliable correspondence. Under the scenario, appearance-based match 520 becomes necessary to make correspondence between tracks 422.

Figure 9:
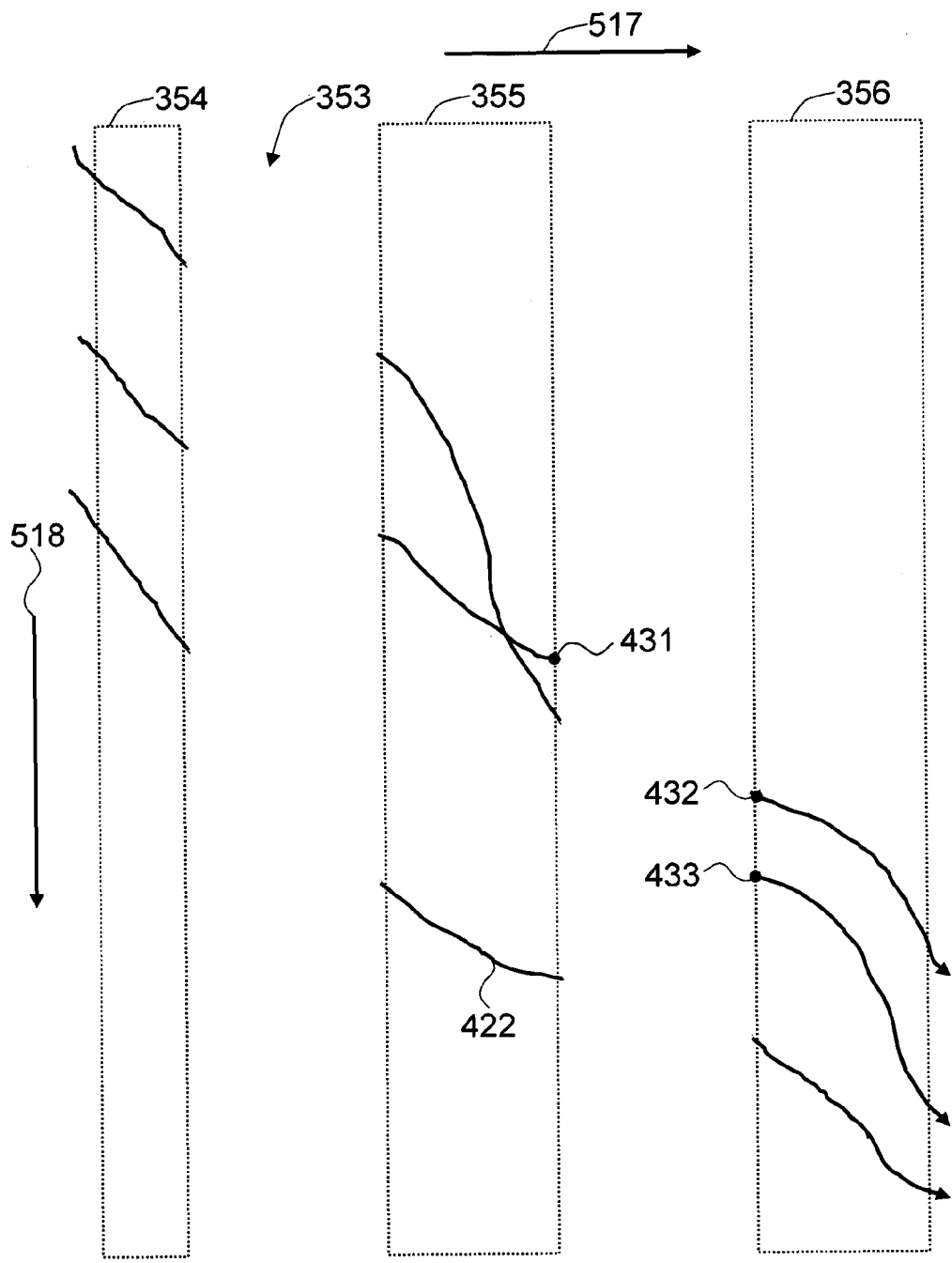
FIG. 9 shows the scheme of spatiotemporal match among tracks from different camera views.

FIG. 9 shows the scheme of spatiotemporal match 510 among tracks from different camera views 341. The horizontal direction in the figure represents spatial dimension 517 (reduced to one dimension for a clear presentation), and the vertical direction represents temporal dimension 518. Each rectangle in the figure represents an area that is covered by a single camera—camera coverage 351, stretched vertically to reveal temporal dimension; a horizontal cross-section of the rectangle is the area at a specific time instance. The area between the camera coverage represents a coverage gap 353.

Each curved lines crossing the rectangles shows a track 422 traversed by each person moving across the camera coverage. Because there are sufficient gaps in this sparse camera placement, the correspondence between tracks from different camera coverage areas has a high degree of ambiguity. For example, the track instance 1 431 in camera coverage area 2 355 can have more than one likely matching instances: both track instance 2 432 and track instance 3 433 in camera coverage area 3 356. Under the circumstance, appearance-based match 520 is necessary to resolve this kind of ambiguity.

Figure 10:
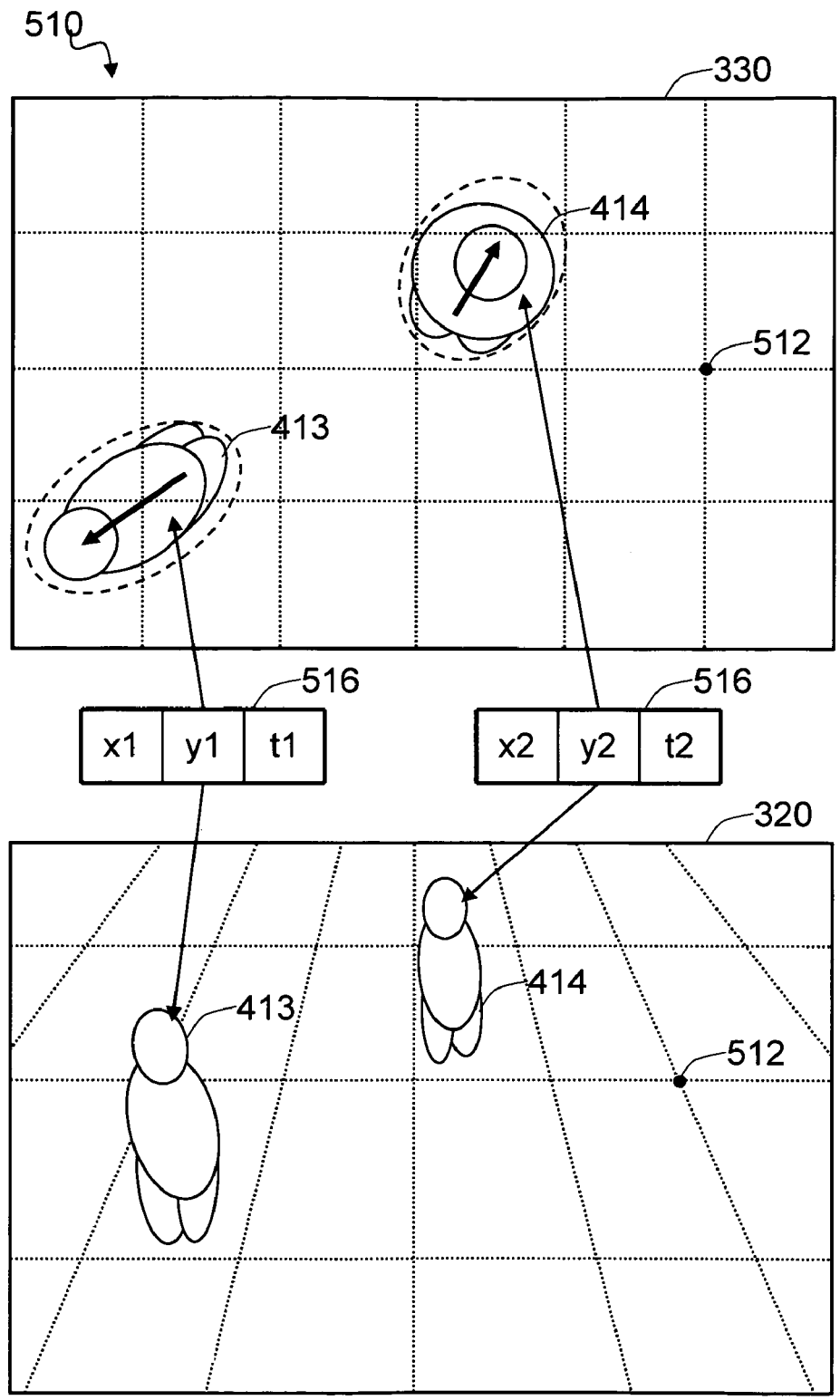
FIG. 10 shows an exemplary embodiment of the scheme of spatiotemporal match.

FIG. 10 shows an exemplary embodiment of the scheme of spatiotemporal match 510. Two people appear in the behavior camera image 330 (top) and the face camera image 320 (bottom). Because each camera's geometry is known, the image coordinate can be projected to a world-coordinate 512; the world-coordinate 512 is shown as points on the grid. The face camera image positions of person A 413 and person B 414 are projected to the individual world-coordinates 513; the behavior camera image positions of person A 413 and person B 414 are projected to the individual world-coordinates 513. The world-coordinates 513 along with timestamps constitute spatiotemporal coordinates 516. Because the spatiotemporal coordinates 516 provide a clear match between person instances at the overlapped region, the resulting correspondence is essentially reliable.

Figure 11:
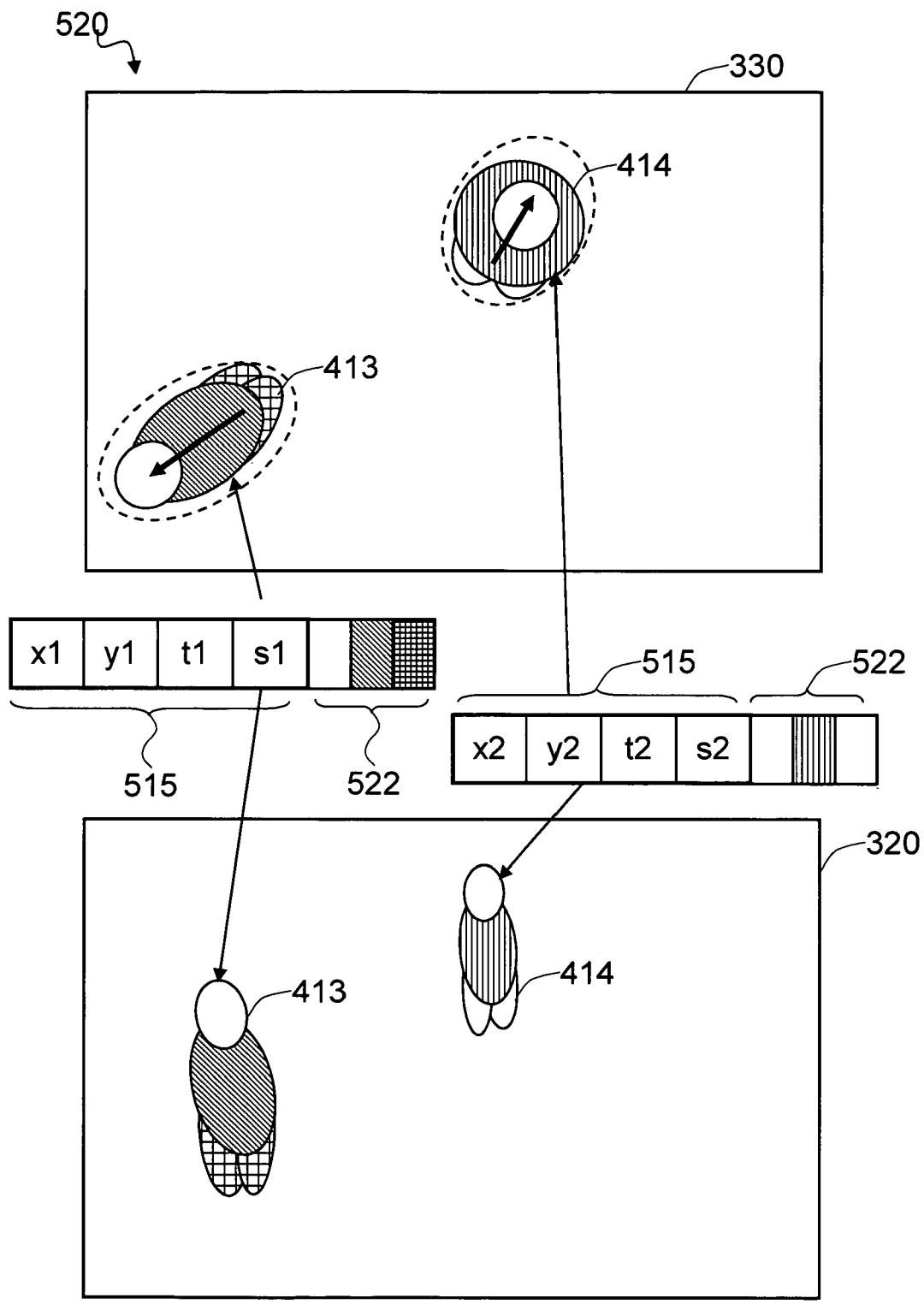
FIG. 11 shows an exemplary embodiment of the scheme of appearance-based match.

FIG. 11 shows an exemplary embodiment of the scheme of appearance-based match 520. When the face camera view 345 and the behavior camera view 346 do not overlap, the correspondence based on spatiotemporal coordinates 516 necessarily carries much uncertainty, because the movements of people between the two camera views are not observable. Under this scenario, the appearance information can be exploited to find matches. As shown in the figure, the same person appears quite differently to face camera images and behavior camera images due to the difference in viewpoint. However, it is still possible to draw some invariant features, such as color signatures. In one of the exemplary embodiments, the appearance-based match scheme aims to extract these invariant color signatures using a machine learning approach. The extracted invariant appearance signature 522 is appended to the spatiotemporal coordinate 515, so that the combined feature is used to resolve correspondence ambiguities.

Figure 12:
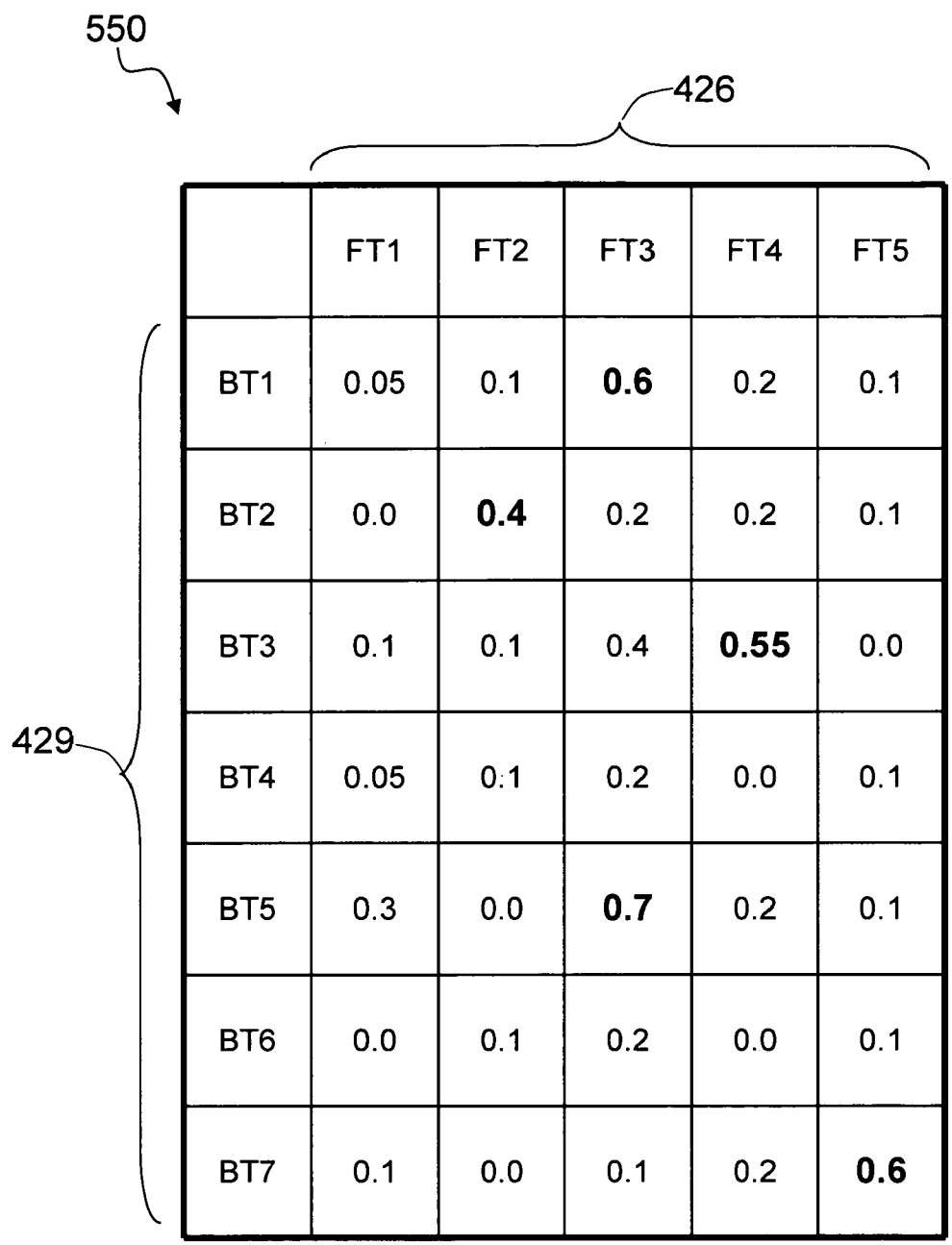
FIG. 12 shows the pairwise person verification step, which is an exemplary embodiment of person identity verification.

FIG. 12 shows the pairwise person verification 550 step, which is an exemplary embodiment of person identity verification 530. Given a list of face camera tracks 426 and a list of behavior camera tracks 429, the combination of spatiotemporal match 510 and the appearance-based match 520 produces a table of match scores of all (FT: face track, BT: behavior track) pairs. For a given face camera track 425, the behavior camera track 428 that produces the highest score with the face camera track is chosen as the match. However, a threshold is used to filter out matches (even though they are top matches) that do not have a high enough score; sometimes some tracks do not have matching instance in another camera due to many possible reasons. In some cases, a person may not enter the area that is covered by either of the cameras. In other cases, a person may not be detected and tracked due to the failures of the tracking algorithm. In the figure, the matches after applying a threshold (0.5) are marked as scores with boldface.

Figure 13:
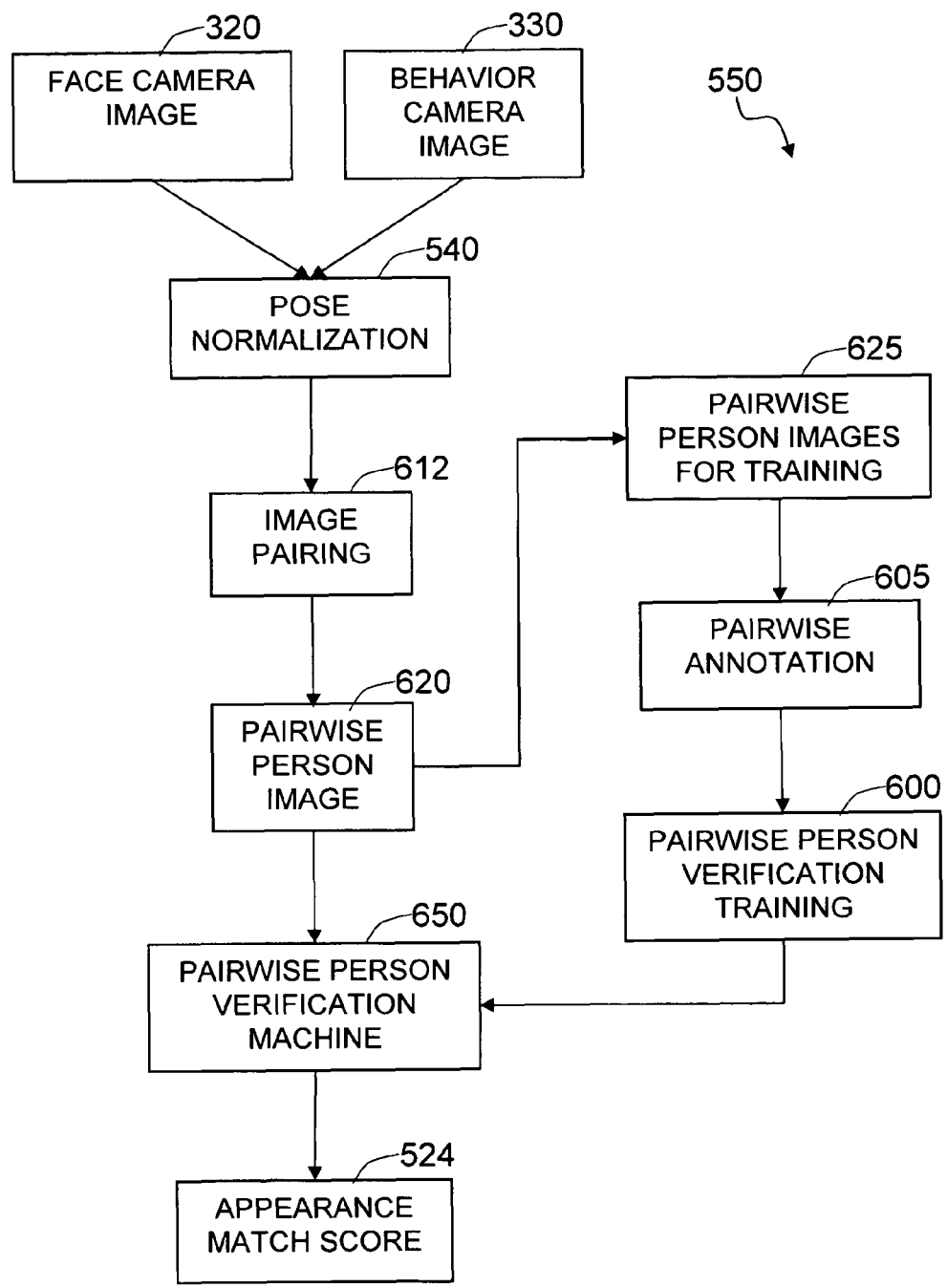
FIG. 13 shows an exemplary embodiment of the appearance-based match based on pairwise person verification training.

FIG. 13 shows an exemplary embodiment of the pairwise person verification 550 based on pairwise person verification training 600. Both the face camera image 320 and the behavior camera image 330 are processed in the pose normalization 540 step, where the pose of the person is normalized for position, size, and orientation. In the image pairing 612 step, these normalized person images are combined to form a pairwise person image 620. Using the same scheme, many such pairwise person images are generated for training 625. Each pairwise person image 620 has either a matching or non-matching pair of person images from different cameras. In the pairwise annotation 605 step, typically a human annotator determines whether or not the pair of images belongs to the same person. When they belong to the same person, the pairwise person image is given a match score 1, and given a match score 0 otherwise. The pairwise person verification training 600 step trains learning machines so that the learning machines estimate the match score between the pair.

Once the pairwise person verification machine 650 has been trained, it can take any such pairwise person image 620 and determine its match score, to estimate the appearance match score 524.

In one of the exemplary embodiments, each of the multiple learning machines take part in a specific body pose from the behavior camera.

Figure 14:
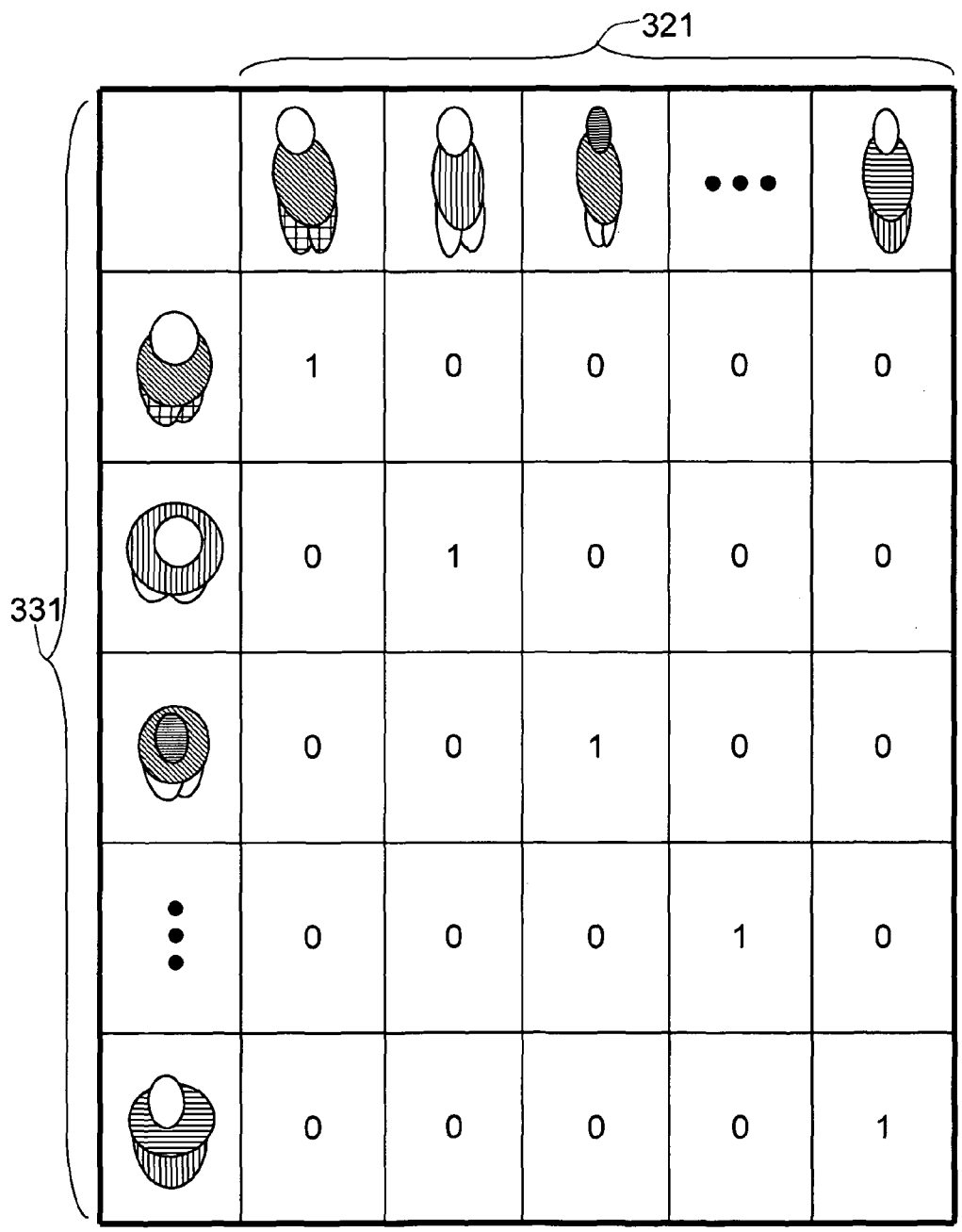
FIG. 14 shows an exemplary embodiment of the pairwise annotation to generate pairwise person images for training.

FIG. 14 shows an exemplary embodiment of the pairwise annotation 605 to generate pairwise person images for training. The behavior camera images 331 are placed in the first row of the table. The face camera images 321 are placed in the first column of the table. The number 0 or 1 in i-th row and j-th column represents the appearance match score when the corresponding i-th behavior camera image and j-th face camera image are paired together as a pairwise image 610. When the i-th behavior camera image and the j-th face camera image are instances of the same person, the corresponding appearance match score is 1, otherwise 0. Because there are vastly more non-matching pairs than matching pairs, the pairwise training images can be sampled to balance the number of matching pairs and the number of non-matching pairs. The table can have more than one face camera image or behavior camera image from the same person; the non-diagonal element can have an appearance match score of 1.

Figure 15:
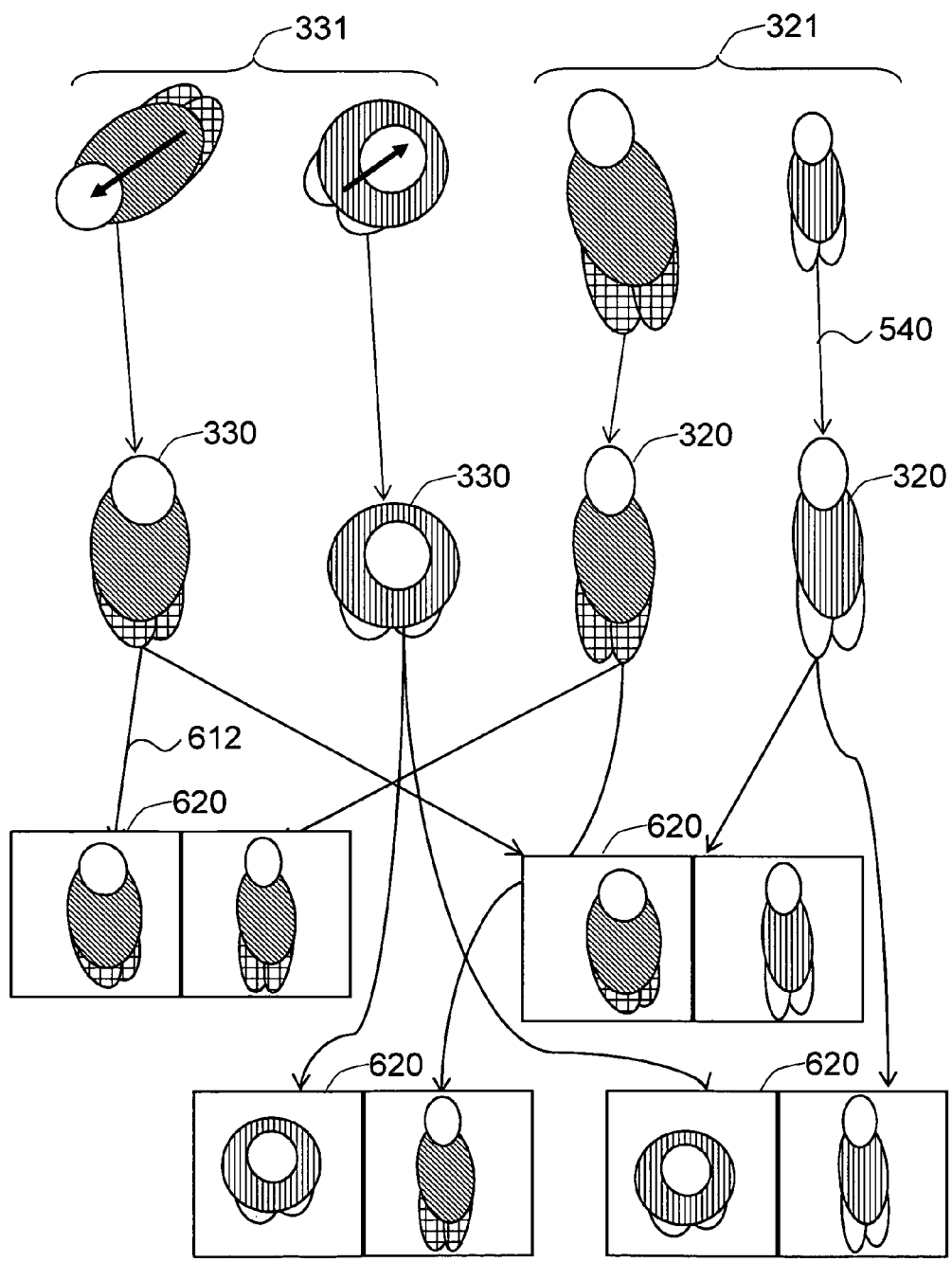
FIG. 15 shows an exemplary embodiment of the pose normalization and image pairing steps.

FIG. 15 shows an exemplary embodiment of the pose normalization 540 and image pairing 612 steps. The behavior camera images 331 and the face camera images 321 have different position, size, and orientation, depending on the distance of the person from camera and the position of the person relative to the camera axis. The pose normalization 540 step corrects for these variations so that each corrected image has standard position, size, and orientation within the image frame. Due to the upright pose of a person in most circumstances, the body orientation in the image frame is determined by the floor position of the person relative to the camera. The floor position-dependent body orientation can be computed and stored as prior information, based on the camera position and orientation relative to the area to be monitored. The step simply estimates the floor position of a person, and applies an appropriate image rotation based on the prior information, so that the body image can have a standard orientation.

The image pairing 612 step combines each face camera image 320 and each behavior camera image 330 to form a pairwise person image 620. In the exemplary embodiment, the face camera image is placed on the right and the behavior camera image is place on the left. The order can be reversed, but it is beneficial to have fixed ordering for placing the images from face cameras and behavior cameras.

Figure 16:
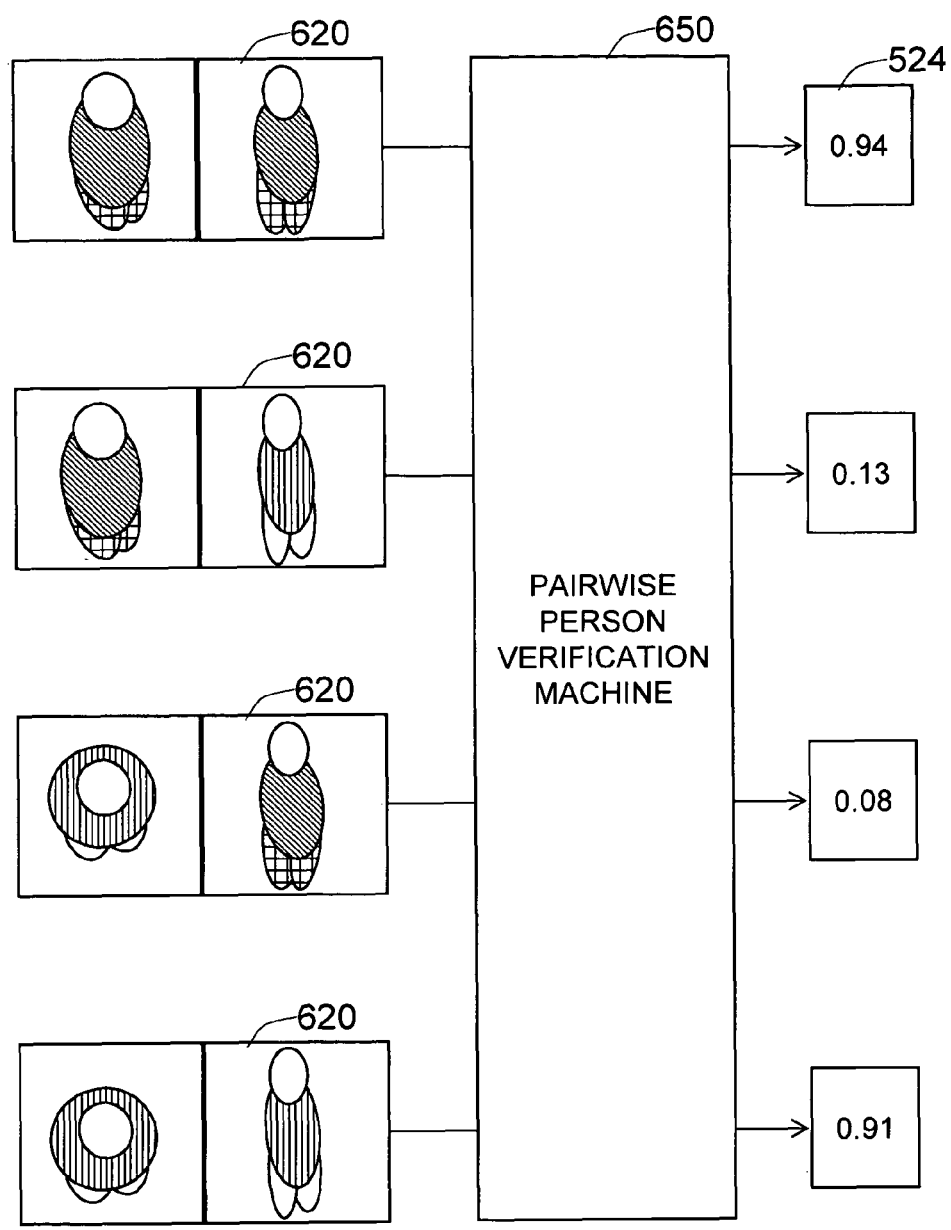
FIG. 16 shows an exemplary embodiment of the operation of the pairwise person verification machine.

FIG. 16 shows an exemplary embodiment of the operation of the pairwise person verification machine 650. Once the pairwise person verification machine 650 has been trained from the pairwise person verification training 600 step, the machine is ready to process any pairwise person image 620 to estimate its appearance match score 524. In the figure, the pairwise person verification machine is fed with both a matching pairwise person image 620 and a non-matching pairwise person image 620. The machine is trained to output an appearance match score 524 close to 1 for a matching pairwise person image and a score close to 0 for a non-matching pairwise person image.

Figure 17:
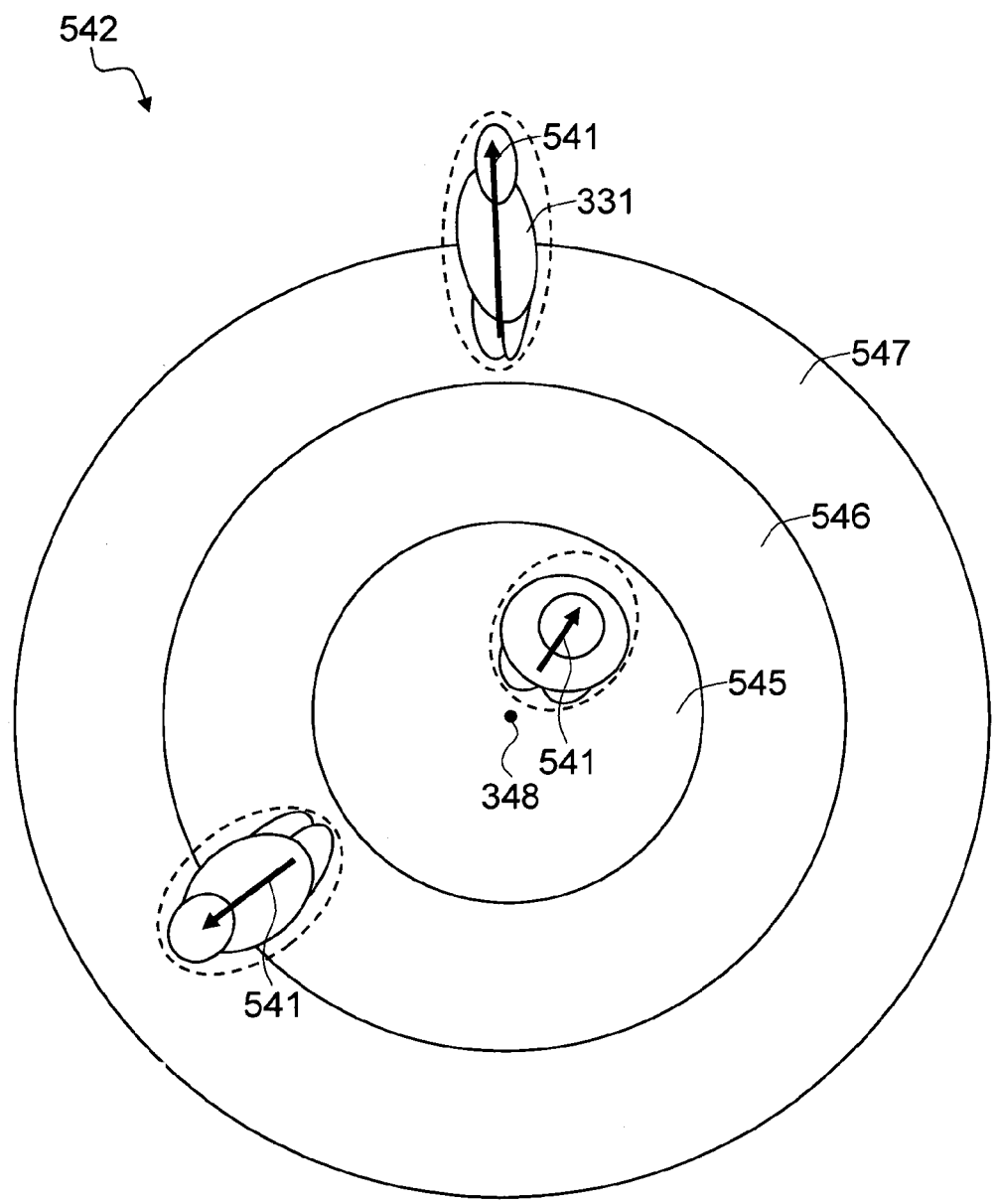
FIG. 17 shows an exemplary embodiment of the pose determination step for behavior camera images.

FIG. 17 shows an exemplary embodiment of the pose determination 542 step for behavior camera images 331. Based on the behavior camera position and orientation, it is straightforward to predict how the upright body image will be oriented according to the floor position. The kind of changes that the body images go through due to the floor position depends on the distance of the body from the camera axis 348. In this embodiment, the behavior camera faces downward vertically. The monitored area is divided into three concentric regions (pose 1 region 545, pose 2 region 546, and pose 3 region 547), where body images within each region go through a very similar degree of distortion. The pose normalization 540 step adjusts for the body pose 541; the orientation is also readily determined from the (angular) floor position of the body image.

Figure 18:
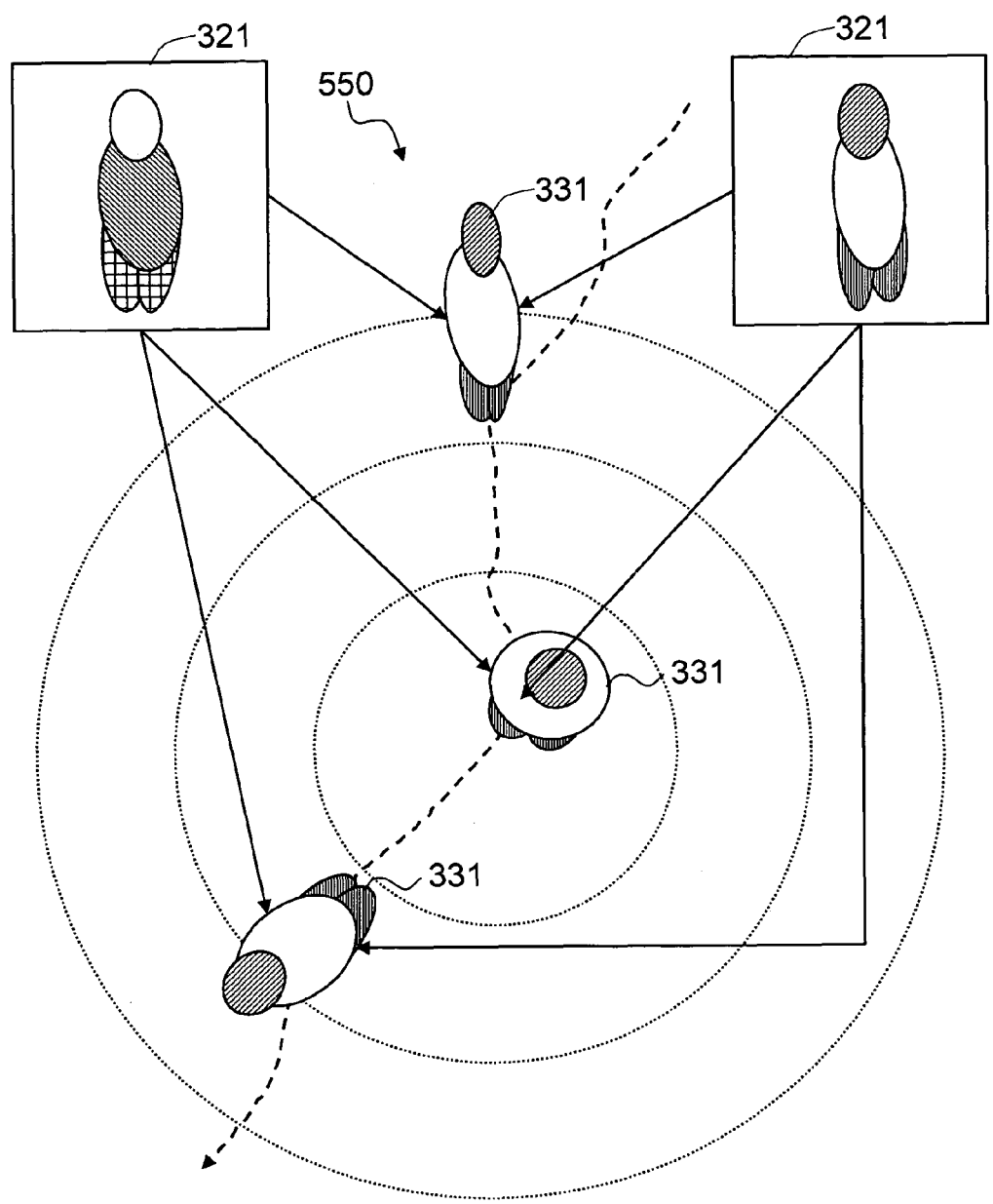
FIG. 18 shows an exemplary embodiment of the pairwise person verification step.

FIG. 18 shows an exemplary embodiment of the pairwise person verification 550 step. Given face camera images 321 belonging to the same person, there are multiple candidates from the behavior camera images 331. The candidate behavior camera images 331 can be chosen based on spatiotemporal proximity to the given face camera images; the step chooses those behavior camera images that appear within some reasonable time interval and distance from the appearance of the face camera image instance.

In this embodiment, the candidate face camera images can be compared to multiple behavior camera images that have been acquired at different times on the track of the person. The best match scores between the behavior camera image instances and the given face camera image is chosen as the match score between the face track and the behavior track.

Figure 19:
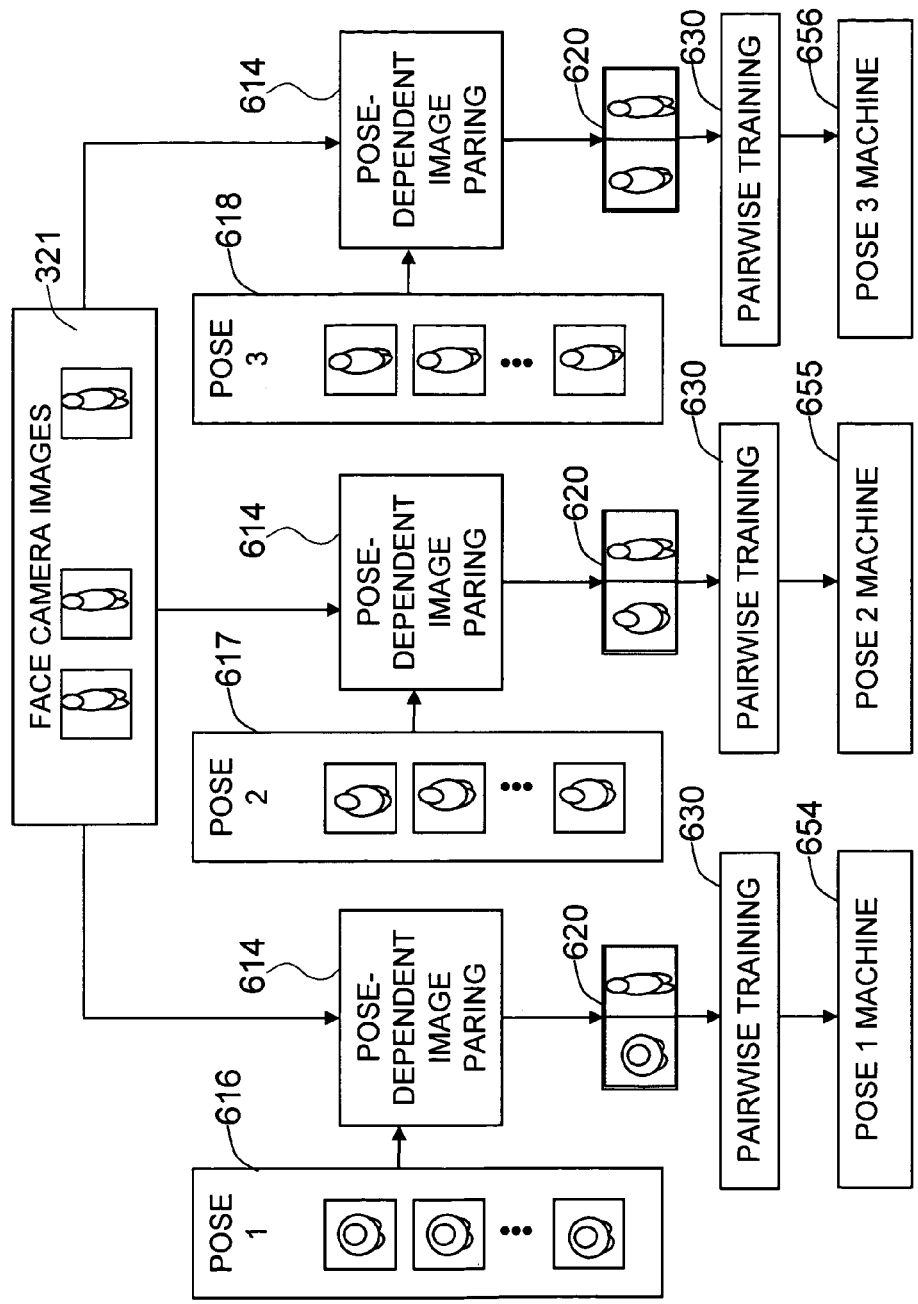
FIG. 19 illustrates the pose-dependent pairwise person verification training, which is an exemplary embodiment of the pairwise person verification training.

FIG. 19 illustrates the pose-dependent pairwise person verification training 630, which is an exemplary embodiment of the pairwise person verification training 600.

The pose-dependent image pairing 614 pairs face camera images 321 with behavior camera images 331, where the behavior camera images are grouped together according to the pose—called pose-dependent images 615. The pose dependent behavior camera images 615 go to the first image in the pairwise person image 620, and the face camera images 321 go to the second image in the pairwise person image 620. The pairwise training 630 then produces the pose 1 machine 654, which then takes any pairwise person image having the first image from pose 1 behavior camera images 616. Given a pairwise person image 620 whose first image is from the pose 1 behavior camera images 616, the pose 1 machine 654 determines the matching score between the face camera image and the behavior camera image. The pose 2 machine 655 and the pose 3 machine 656 are trained in the same manner.

In an exemplary embodiment, the pose-dependent pairwise person verification training step 630 can comprise support vector machine training or standard back-propagation neural network training.

Figure 20:
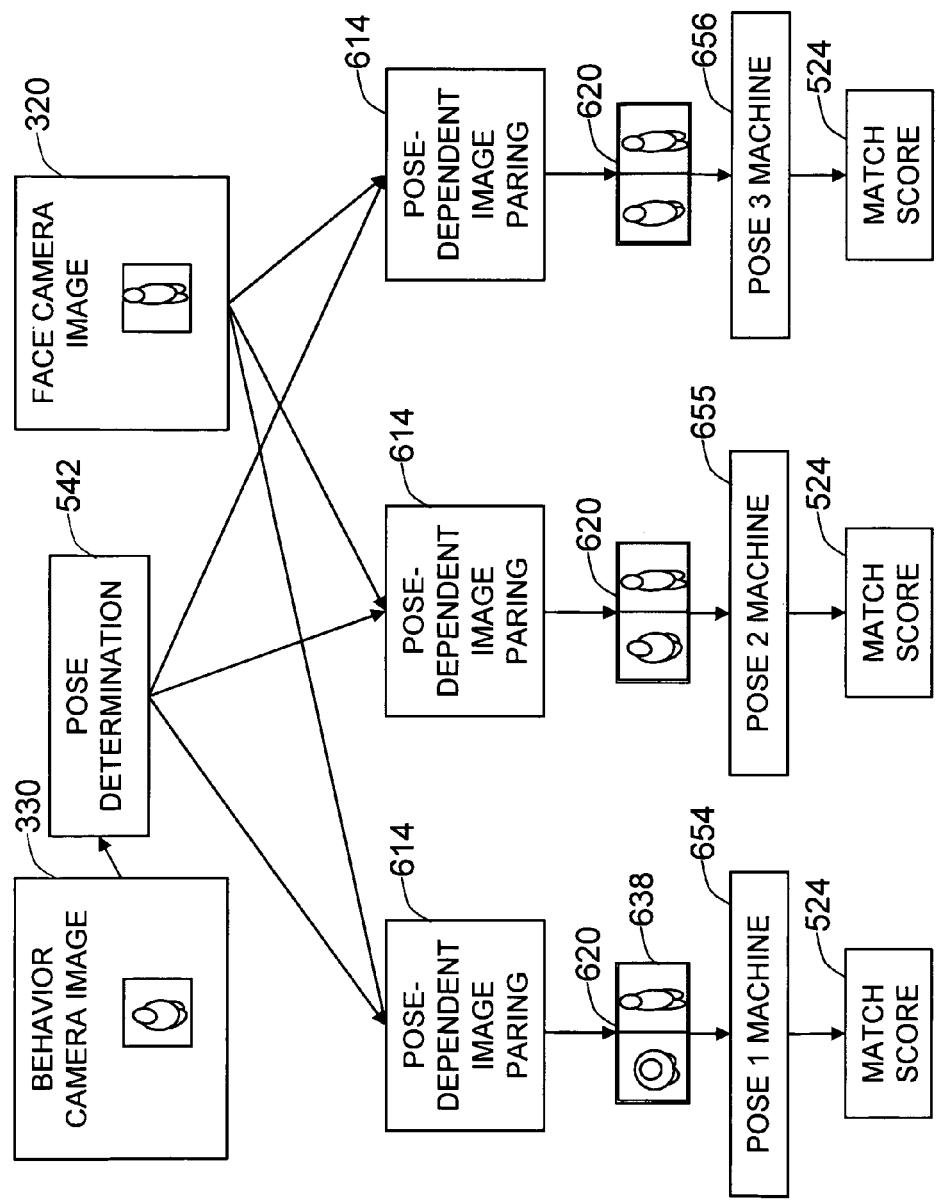
FIG. 20 illustrates an exemplary embodiment of the pose-dependent processing of a pair of person images, consisting of one face camera image and one behavior camera image, to compute the matching score between the two images.

FIG. 20 illustrates an exemplary embodiment of the pose-dependent processing of a pairwise person image 620, consisting of one face camera image 320 and one behavior camera image 330, to compute the appearance match score 524 between the two images. The pose-dependent image pairing 614 step combines the given face camera image with the behavior camera image, to form the pairwise person image; the behavior camera image goes to the first image and the face camera image goes to the second image in the pair. From the behavior camera image, the pose of the body has been determined based on its floor position in the pose determination 542 step. Based on the determined pose, the pairwise person image 620 is then fed to one of the pose-dependent machines 652 (pose 1 machine 654 through pose 3 machine 656) to compute the appearance match score 524 between the face camera image 329 and the behavior camera image 330.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for making a correspondence between a face camera track and a behavior camera track, comprising the following steps of:
    a) constructing a database of pairwise person images, where each pairwise person image comprises a person image from a face camera and a person image from a behavior camera,
    b) annotating the database of pairwise person images based on whether the pair of person images in each pairwise person image belongs to the same person,
    c) training at least a pairwise person verification machine to estimate appearance match scores between the pair of person images in the pairwise person images from the database,
    d) acquiring a person image from the face camera track and a person image from the behavior camera track to form a second pairwise person image, and
    e) estimating an appearance match score between the pair of person images in the second pairwise person image, using the pairwise person verification machines on the second pairwise person image to calculate correspondence between the face camera track and the behavior camera track.

2. The method according to claim 1, wherein the method further comprises a step of sampling the pairwise person images for training, so that the number of matching pairs and the number of non-matching pairs are balanced.

3. The method according to claim 1, wherein the method further comprises a step of estimating and correcting the pose of the person image based on the person's floor position relative to the camera axis.

4. The method according to claim 1, wherein the method further comprises a step of dividing the view of the face camera or the behavior camera into regions to process person images within each region separately,
    wherein the person image in each region goes through a similar degree of distortion due to the orientation of the camera with respect to the region.

5. The method according to claim 4, wherein the method further comprises a step of training multiple pairwise person verification machines, wherein each pairwise person verification machine is specialized to a specific range of person image pose and distortion.

6. The method according to claim 1, wherein the method further comprises a step of estimating the position of the face camera person image and the position of the behavior camera person image in a common coordinate system to measure the spatial proximity of the person images.

7. The method according to claim 1, wherein the method further comprises a step of utilizing the spatiotemporal proximity of the face camera person image and the position of the behavior camera person image.

8. The method according to claim 7, wherein the method further comprises a step of combining the appearance match score and the spatiotemporal proximity between the face camera person image and the position of the behavior camera person image to find correspondence between the face camera track and the behavior camera track.

9. The method according to claim 1, wherein the method further comprises a step of acquiring multiple person images from the face camera track and multiple person images from the behavior camera track to process multiple pairwise person images for finding the best match.

10. The method according to claim 1, wherein the method further comprises a step of making correspondences between face classification data obtained from the face camera track and behavior data obtained from the behavior camera track.

11. The method according to claim 10, wherein the method further comprises a step of using demographics classification data or person identification data as the face classification data.

12. The method according to claim 10, wherein the method further comprises a step of using shopper behavior data as the behavior data.

13. An apparatus for making a correspondence between a face camera track and a behavior camera track, comprising:
   a) means for constructing a database of pairwise person images, where each pairwise person image comprises a person image from a face camera and a person image from a behavior camera,
   b) means for annotating the database of pairwise person images based on whether the pair of person images in each pairwise person image belongs to the same person,
   c) means for training at least a pairwise person verification machine to estimate appearance match scores between the pair of person images in the pairwise person images from the database,
   d) means for acquiring a person image from the face camera track and a person image from the behavior camera track to form a second pairwise person image, and
   e) means for estimating an appearance match score between the pair of person images in the second pairwise person image, using the pairwise person verification machines on the second pairwise person image to calculate correspondence between the face camera track and the behavior camera track.

14. The apparatus according to claim 13, wherein the apparatus further comprises means for sampling the pairwise person images for training, so that the number of matching pairs and the number of non-matching pairs are balanced.

15. The apparatus according to claim 13, wherein the apparatus further comprises means for estimating and correcting the pose of the person image based on the person's floor position relative to the camera axis.

16. The apparatus according to claim 13, wherein the apparatus further comprises means for dividing the view of the face camera or the behavior camera into regions to process person images within each region separately,
   wherein the person image in each region goes through a similar degree of distortion due to the orientation of the camera with respect to the region.

17. The apparatus according to claim 16, wherein the apparatus further comprises means for training multiple pairwise person verification machines, wherein each pairwise person verification machine is specialized to a specific range of person image pose and distortion.

18. The apparatus according to claim 13, wherein the apparatus further comprises means for estimating the position of the face camera person image and the position of the behavior camera person image in a common coordinate system to measure the spatial proximity of the person images.

19. The apparatus according to claim 13, wherein the apparatus further comprises means for utilizing the spatiotemporal proximity of the face camera person image and the position of the behavior camera person image.

20. The apparatus according to claim 19, wherein the apparatus further comprises means for combining the appearance match score and the spatiotemporal proximity between the face camera person image and the position of the behavior camera person image to find correspondence between the face camera track and the behavior camera track.

* * * * *